United States Patent
Raksha et al.

(10) Patent No.: US 11,186,110 B2
(45) Date of Patent: Nov. 30, 2021

(54) ARTICLE WITH ANGLED REFLECTIVE SEGMENTS

(71) Applicant: VIAVI SOLUTIONS INC., San Jose, CA (US)

(72) Inventors: Vladimir Raksha, Santa Rosa, CA (US); Cornelis Jan Delst, Fairfax, CA (US)

(73) Assignee: VIAVI SOLUTIONS INC., San Jose, CA (US)

( * ) Notice: Subject to any disclaimer, the term of this patent is extended or adjusted under 35 U.S.C. 154(b) by 174 days.

(21) Appl. No.: 16/330,027

(22) PCT Filed: Aug. 31, 2017

(86) PCT No.: PCT/US2017/049735
§ 371 (c)(1),
(2) Date: Mar. 1, 2019

(87) PCT Pub. No.: WO2018/045233
PCT Pub. Date: Mar. 8, 2018

(65) Prior Publication Data
US 2019/0225003 A1 Jul. 25, 2019

Related U.S. Application Data

(60) Provisional application No. 62/382,187, filed on Aug. 31, 2016.

(51) Int. Cl.
*B42D 25/29* (2014.01)
*G02B 5/124* (2006.01)
(Continued)

(52) U.S. Cl.
CPC ............ *B42D 25/29* (2014.10); *B42D 25/30* (2014.10); *B42D 25/324* (2014.10); *G02B 5/124* (2013.01);
(Continued)

(58) Field of Classification Search
CPC ...... B42D 25/29; B42D 25/30; B42D 25/324; B42D 25/369; B42D 25/373;
(Continued)

(56) References Cited

U.S. PATENT DOCUMENTS 4,055,377 A 10/1977 Erickson et al.
5,840,405 A * 11/1998 Shusta .................. G02B 5/124
428/156
(Continued)

FOREIGN PATENT DOCUMENTS

CA 2600431 A1 9/2006
CN 104284738 1/2015
(Continued)

OTHER PUBLICATIONS

International Search Report and Written Opinion dated Dec. 21, 2017, PCT Patent Application No. PCT/US2017/049730, filed Aug. 31, 2017, Russian Federal Institute of Industrial Property.
(Continued)

*Primary Examiner* — Kimberly N. Kakalec
(74) *Attorney, Agent, or Firm* — Mannava & Kang, P.C.

(57) ABSTRACT

According to examples, an article may include a base layer that extends along a first dimension and a second dimension, in which the second dimension is orthogonal to the first dimension. The article may also include reflective ribbons provided on an upper surface of the base layer, in which the reflective ribbons positioned along a common plane extending in the second dimension have dihedral angles that change as a function of distance across the common plane.

18 Claims, 21 Drawing Sheets

(51) Int. Cl.
    *G02B 17/00*      (2006.01)
    *G02B 5/136*      (2006.01)
    *G02B 5/18*      (2006.01)
    *B42D 25/324*      (2014.01)
    *B42D 25/30*      (2014.01)

(52) U.S. Cl.
    CPC ........... *G02B 5/136* (2013.01); *G02B 5/1861* (2013.01); *G02B 17/002* (2013.01)

(58) Field of Classification Search
    CPC .... B42D 25/425; G02B 17/002; G02B 5/136; G02B 5/1861; G02B 5/124; G02B 5/122
    See application file for complete search history.

(56) References Cited

U.S. PATENT DOCUMENTS

| | | | |
|---|---|---|---|
| 6,017,657 | A | 1/2000 | Mentz et al. |
| 6,024,455 | A | 2/2000 | O'Neill et al. |
| 2002/0154423 | A1* | 10/2002 | Gubela, Sr. ............ G02B 5/124 359/850 |
| 2002/0182383 | A1 | 12/2002 | Phillips et al. |
| 2006/0198998 | A1 | 9/2006 | Raksha et al. |
| 2006/0097515 | A1 | 11/2006 | Raksha et al. |
| 2007/0109641 | A1 | 5/2007 | Miruma |
| 2007/0200002 | A1 | 8/2007 | Raksha et al. |
| 2008/0258456 | A1 | 10/2008 | Rahm et al. |
| 2009/0200791 | A1 | 8/2009 | Despland et al. |
| 2010/0021658 | A1 | 1/2010 | Raksha et al. |
| 2011/0221431 | A1 | 9/2011 | Kwon et al. |
| 2015/0004276 | A1 | 1/2015 | Kojima et al. |
| 2015/0231912 | A1 | 8/2015 | Yoon et al. |
| 2016/0023495 | A1 | 1/2016 | Fuhse et al. |
| 2016/0187546 | A1 | 6/2016 | Raksha et al. |
| 2017/0082787 | A1* | 3/2017 | Yashiki .................... G02B 5/08 |

FOREIGN PATENT DOCUMENTS

| | | | |
|---|---|---|---|
| CN | 105334558 | 2/2016 | |
| DE | 102013019944 | 5/2015 | |
| EA | 13422 B1 | 4/2010 | |
| EP | 0710508 A1 | 8/1996 | |
| EP | 3000613 A1 | 3/2016 | |
| EP | 3178569 | 6/2016 | |
| JP | 2001228316 | 8/2001 | |
| JP | 2003022526 | 1/2003 | |
| KR | 10-2007-0089055 | 8/2007 | |
| KR | 10-20070112428 | 11/2007 | |
| KR | 10-20110058700 | 6/2011 | |
| RU | 2429083 C2 | 9/2011 | |
| WO | 2004007095 A2 | 1/2004 | |
| WO | WO-2010100360 A1 * | 9/2010 | ............ D21H 21/40 |
| WO | 2014060089 A2 | 4/2014 | |
| WO | 2015095189 A1 | 6/2015 | |
| WO | 2016/083259 A1 | 6/2016 | |
| WO | 2016015973 | 6/2017 | |

OTHER PUBLICATIONS

International Search Report and Written Opinion dated Jan. 25, 2018, PCT Patent Application No. PCT/US2017/049735, filed Aug. 31, 2017, Russian Federal Institute of Industrial Property.

* cited by examiner

ARTICLE WITH ANGLED REFLECTIVE SEGMENTS

CLAIM FOR PRIORITY AND CROSS REFERENCE TO RELATED APPLICATION

This application is a national stage filing under 35 U.S.C. § 371 of PCT application number PCT/US2017/049735, having an international filing date of Aug. 31, 2017, which claims the benefit of priority to U.S. Provisional Patent Application Ser. No. 62/382,187 filed on Aug. 31, 2016 and entitled "ARTICLE WITH ANGLED REFLECTIVE SEGMENTS," the disclosure of which is hereby incorporated by reference in its entirety. This application also contains similar subject matter to U.S. Patent Application Ser. No. 62/382,185, filed on Aug. 31, 2016, the disclosure of which is hereby incorporated by reference in its entirety.

BACKGROUND

Optically variable devices are used in a wide variety of applications, both decorative and utilitarian. Optically variable devices can be made in a variety of ways to achieve a variety of effects. Examples of optically variable devices include the holograms imprinted on credit cards and authentic software documentation, color-shifting images printed on banknotes, and enhanced surface appearances of items such as motorcycle helmets and wheel covers.

Optically variable devices can be made as a film or a foil that is pressed, stamped, glued, or otherwise attached to an object, and can also be made with optically variable pigments embedded into an organic binder that is printed or coated onto a hard or flexible substrate. One type of optically variable pigment is commonly called a color-shifting pigment because the apparent color of images appropriately printed with such pigments changes with a change of the angle of observation. A common example is the "20" printed with color-shifting pigment in the lower right-hand corner of a U.S. twenty-dollar bill, which serves as an anti-counterfeiting device.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1A:
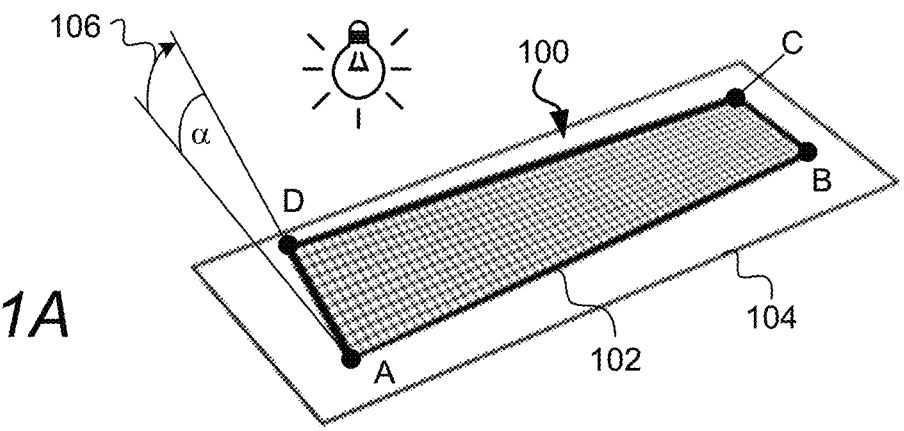
FIGS. 1A and 1B, respectively, show diagrams of a helical mirror that exhibits ortho-parallactic movement of a generated optical effect, according to two examples of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on. As used herein, the terms "substantially," "approximately," and "about" indicate a range of values within +1-5% of a stated value.

Additionally, the elements depicted in the accompanying figures may include additional components and some of the components described in those figures may be removed and/or modified without departing from scopes of the present disclosure. Further, the elements depicted in the figures may not be drawn to scale and thus, the elements may have sizes and/or configurations that differ from those shown in the figures. As used herein, the term "normal angle of observation" may be defined as observation from an angle normal (perpendicular) to the surface.

Disclosed herein are articles that provide an ortho-parallactic optical effect. In some examples, these articles may be placed within another article, such as a document of value, a security label, or similar item. An ortho-parallactic effect may be described whereby tilting the upper edge of the article away from or towards an observer, he or she may perceive a bright shape of reflected light moving from left to right or right to left. As another example, by tilting the left edge away from or towards an observer, he or she may perceive a bright shape of reflected light moving from top to bottom or bottom to top. In some examples, if and how the effect is perceived may depend upon how the security device is placed on or within the article, whether the upper edge is tilted away from or towards the observer, and/or the position, strength, and/or distance of the light source. Alternatively, an ortho-parallactic optical effect may be described whereby there exists an axis of rotation (the axis lying in the article) such that an observer rotating the article about the axis, depending on the light source, observes a reflective shape or image moving along the axis of rotation. An ortho-parallactic optical effect may further be described as an optical effect in which an optical feature such as a shape that appears brighter or darker than other sections of the article appears to move across the article in a direction that is orthogonal to the tilting direction of the article. Thus, for instance, when the article is tilted about a horizontal axis, the optical feature may appear to move in a longitudinal direction. It should be noted that the moving shape described herein may be any image, including but not limited to, a band (as illustrated in at least FIGS. 5A-B, 7A-F, 8A-C, etc.) a logo, a symbol, a figure, etc. Further, an observer may include, a camera, a viewing device (e.g., microscope, binoculars, etc.), or the physical eye of an animal, including a human.

In examples, reflective ribbons are formed on a base layer, for instance, through embossing of the base layer. In this example, the base layer may be embossed to have ribbons, in which the surfaces of the ribbons may be twisted or planar-faceted. The ribbons may have angles relative to the base layer, in which the values of the angles may differ or change as a function of distance along an axis. For instance, the values of the angles of the ribbons may continually increase as a function of the distance along the axis. In other examples, the values of the angles of the ribbons may increase in a stepwise fashion along the axis. The increase may be linear or non-linear and may result in the reflective ribbon or series of reflective ribbons having a helical or spiral configuration.

In some examples, reflective magnetically-orientable flakes may be employed to generate the ortho-parallactic optical effect. In these examples, each magnetically-orientable flake may have a respective dihedral angle with respect to the plane of the substrate, where the respective dihedral angle of a magnetically-orientable flake is set at a given value depending on the direction of the magnetic field (experienced) at the time that a fluid carrier is exposed to a curing radiation. In examples, the values of the flakes' respective dihedral angles may differ as a function of distance, and therefore position, along an axis. For instance, the values of the angles at which the magnetically-orientable flakes are oriented may continually increase as a function of the distance along the axis. The increase may be linear or non-linear and may result in the angles having a helical or spiral configuration. A dihedral angle may be defined as the angle between two planes in a third plane that cuts the line of intersection at right angles.

The articles disclosed herein, which may equivalently be termed optical elements or security elements, may, for instance, be provided on financial documents, such as banknotes, currency, stock certificates, etc., or other products such as software documentation, security seals, and similar objects as authentication and/or anti-counterfeiting devices.

Figure 1B:
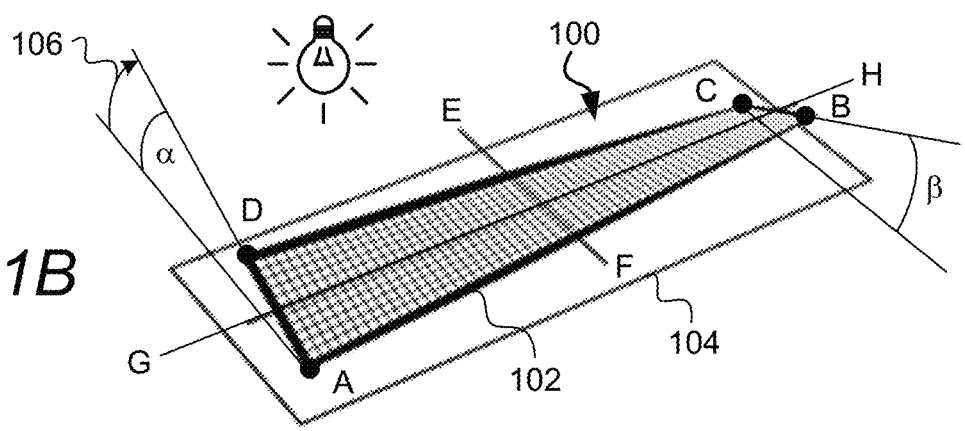

With reference first to FIGS. 1A and 1B, there are respectively shown diagrams of a helical mirror 100 that exhibits ortho-parallactic movement of a generated optical effect, according to two examples of the present disclosure. Particularly, the helical mirror 100 shown in FIGS. 1A and 1B may be described as a twisted reflective surface. In FIG. 1A, a surface 102 is depicted as having points A, B, and C on an xy reference plane 104, while the point D is elevated in a direction 106. The AD edge of the surface 102 having the points ABCD forms an angle α between the surface 102 and the reference plane 104. Alternatively, two or more points of the surface 102 may be off the reference plane 104 as illustrated in FIG. 1B.

In FIG. 1B, the point D located along the edge AD is elevated above the reference plane 104 defining an angle, α. The point B along the edge BC is elevated above the reference plane forming the angle β with the reference plane 104. In this illustrative example, the values of angles α and β may vary in the range from 0° to 90°. The elevations of point B and/or point D above the reference plane 104 creates a twist of the surface 102 of the helical mirror 100. The twist of the helical mirror 100 generally along the line GH (FIG. 1B) may be clockwise or counterclockwise.

Figure 2:
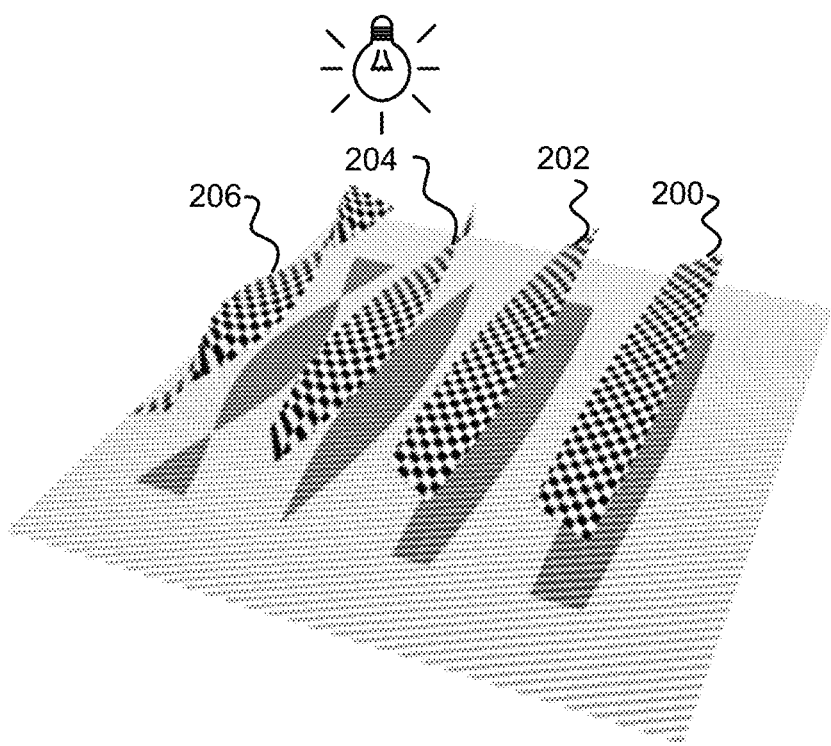
FIG. 2 shows examples of helical mirror configurations.

The twist of the helical mirror 100 may be uniform over the entire length of the mirror. Alternatively, the twist may be non-uniform over the length of the helical mirror 100. For example, FIG. 2 illustrates potential ribbon configurations. The helical mirrors of the present disclosure may substantially align with any of examples 200, 202, 204, and/or 206. FIG. 2 is purely exemplary, however, and this disclosure is not limited thereto. As any mirror, the helical mirrors reflect the light coming to them from a light source. Light reflects from a helical mirror differently than from a flat or spherical mirror. When a helical mirror illuminated by a point source is rotated about its axis, a viewer observes movement of the reflected light spot along its axis as illustrated schematically in FIGS. 3A-3C.

Figure 3A:
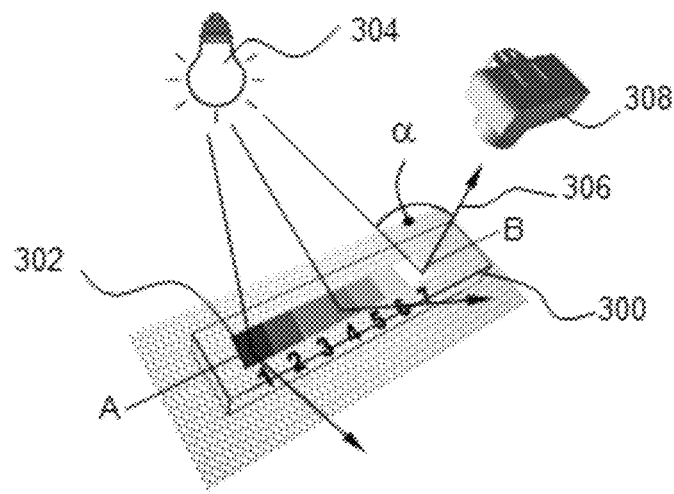
FIGS. 3A-3C, respectively, depict a micro-mirror array of imaginary segments on a ribbon suspended above a reference plane to simulate a surface of a helical micro-mirror.
Figure 3B:
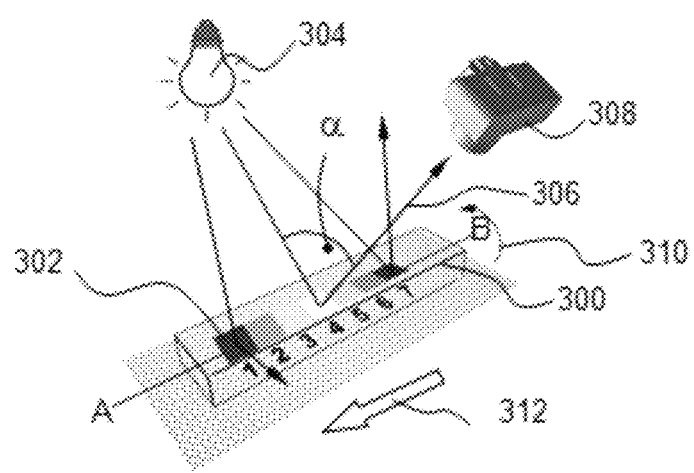
Figure 3C:
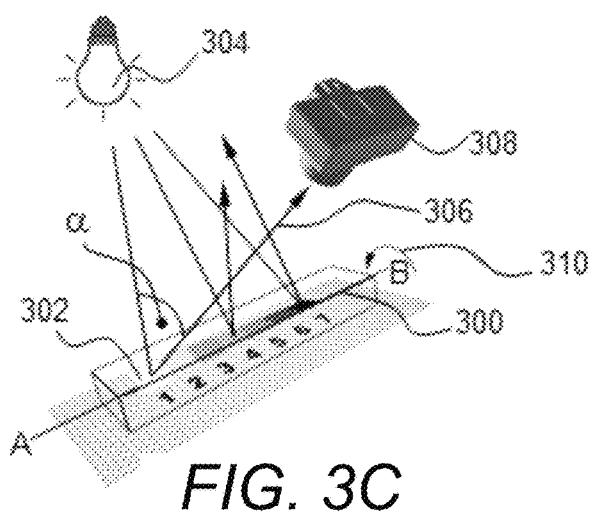

Particularly, FIGS. 3A-3C. respectively, depict a micro-mirror array of imaginary segments on a ribbon 302 composed of a string of seven square imaginary segments arranged end-to-end labeled #1-7 to simulate a surface of a helical micro-mirror. FIGS. 3A, 3B, and 3C each shows the same helical micro-mirror array of imaginary segments at three different rotational positions about an AB axis located above a reference plane 300. A light source 304 and an observer 308 are positioned such that an imaginary segment that is positioned parallel to the reference plane 300 reflects light from the light source 304 to an observer 308, which is schematically represented herein as a camera. As the micro-mirror array of imaginary segments is rotated about the AB axis, the light source 304 is reflected to the observer 308 by the particular imaginary segment #1-7 on the ribbon 302 that is parallel to the reference plane 300. It should be noted that the surface of the ribbon 302 may be smooth and that the imaginary segments are depicted for illustrative purposes.

In the example of FIG. 3A, the micro-mirror array of imaginary segments on the ribbon 302 is rotated −50 degrees about the AB axis. In this position, the white-colored imaginary segment #7, which is now oriented parallel to the reference plane 300, sends the light in the direction 306 toward the observer 308 (camera). In FIG. 3B, the helical micro-mirror array of imaginary segments on the ribbon 302 is rotated +25 degrees about the AB axis compared to FIG. 3A. In FIG. 3B, imaginary segment #4 is parallel to the reference plane 300 and reflects light to the observer 308. In FIG. 3C, the helical micro-mirror array of imaginary segments is rotated another +25 degrees about the AB axis compared to FIG. 3B. In FIG. 3C, imaginary segment #1 is parallel to the reference plane 300 and reflects light to the observer 308. As the imaginary segments #1-7 sequentially reflect light as the micro-mirror array of imaginary segments 302 is rotated about the AB axis, rotating the helical micro-mirror ribbon 302 about the AB axis may give the illusion of a lighted (or bright) segment moving along the AB axis.

Figure 4A:
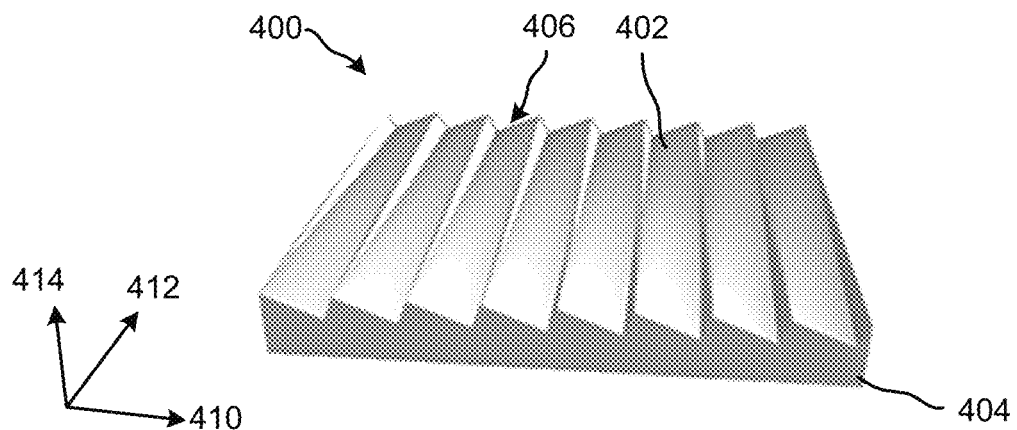
FIGS. 4A-4E, respectively, depict perspective views of articles according to examples of the present disclosure.
Figure 4B:
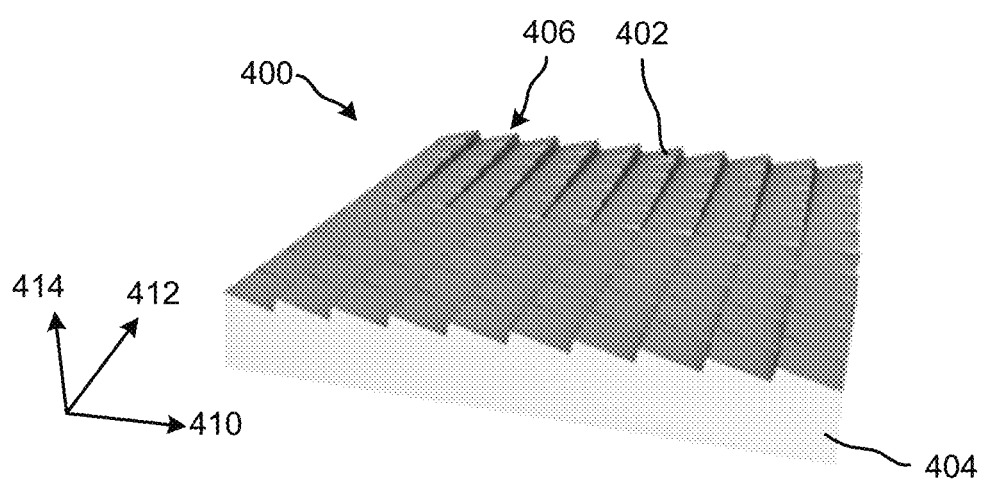
Figure 4C:
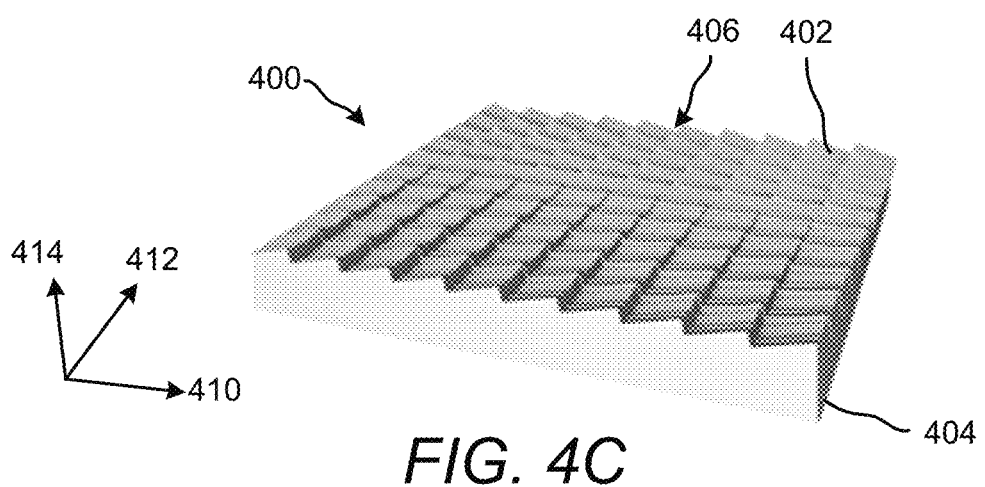
Figure 5A:
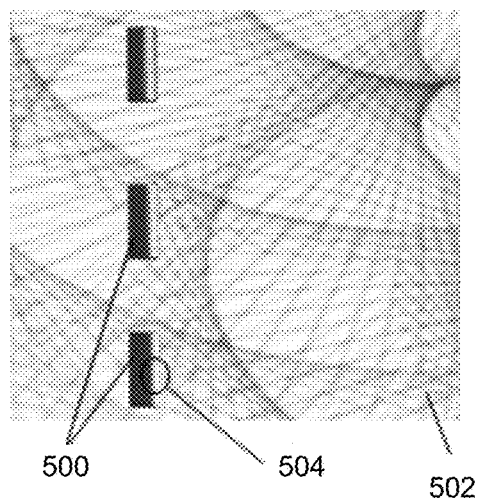
FIGS. 5A and 5B, respectively, show fragments of a security thread for a banknote at various tilt angles.

The helical micro-mirror ribbon 302 may be duplicated to provide a 2-dimensional array of helical micro-mirrors in which 1-D helices are positioned parallel to one another and may be formed into a security thread as shown in FIG. 5A. In other examples, multiple strings (or columns) of reflective ribbons may be provided in arrays on base layers as shown in FIGS. 4A-4C. FIGS. 4A-4C, respectively, depict perspective views of articles 400 according to examples of the present disclosure. The articles 400 in those figures are depicted as containing reflective ribbons 402, which are shown as being provided on an upper surface of a base layer 404. In other words, the upper surface of the base layer 404 may be faceted to form strings 406 (or equivalently columns) of reflective ribbons 402 that are arranged approximately parallel with one another along a first direction 410 and extend in a second orthogonal direction 412. In addition, the reflective ribbons 402 in each of the rows 406 may have angles from the 410-412 plane whose value changes as a function of distance along the ribbons 402, e.g., in the second direction 412. According to examples, as the articles 400 are rotated about the axis represented by the arrow 412, light may be reflected off adjacent sections of the reflective ribbons 402 such that the reflected light appears to move in a direction parallel to the direction 412. In other words, the reflected light appears to move in a direction that is transverse to the direction in which the articles 400 are tilted.

In the examples of FIGS. 4B-4C, the strings 402 of ribbons 402 are faceted and the values of dihedral angles formed between each of the ribbons 402 and the 410-412 planes are depicted as being approximately equal for ribbons in individual rows extending along the first direction 410. However, in the examples of FIGS. 4B-4C the values of the dihedral angles of ribbons in a given row are depicted as being different from the values of the dihedral angles of ribbons in an adjacent or parallel row. Analogously, in the example of FIG. 4A, the values of the dihedral angles of parallel ribbons 402 taken at a given and common value in the second direction 410 are depicted as being approximately the same. Concurrently, when a different given and common value in the second direction 412 is taken, a second value of the dihedral angle of parallel ribbons 402 is achieved, in which the second value is different from the first value. Said differently, in the example of FIG. 4A, the values of the dihedral angles of individual ribbons 402 change as a function of position along the 412 direction. In addition, the changes in the angles of the ribbons 402 may follow a helical configuration, a nearly helical configuration, a bi-helical configuration, or the like. In other examples, the ribbons 402 may have curved reflective surfaces. In still other examples, at least some of the ribbons 402 positioned along a common plane or axis along the second direction 412 may have different angles about the first direction 410 and/or the third direction 414 with respect to each other. In the example of FIG. 4B, the ribbons are planar-faceted, while the example of FIG. 4C utilize facets whose top surface contains a periodic microstructure, such as a diffraction grating, hologram, and the like.

The reflective ribbons 402 may be formed by embossing an upper surface of the base layers 404. The base layers 404 shown in FIGS. 4A-4C may be formed of a polymeric material, a plastic material, a metallic material, and/or combinations thereof. By way of particular example, an embossing die in the form of a roller may be pressed against a moving substrate at an elevated temperature to replicate the relief of the surface of the embossing die onto the surface of the substrate. In another example, the embossing of a micro-relief onto a surface of a substrate may be performed in a layer of UV-sensitive varnish coated on the surface of the substrate and followed by the curing of the varnish. In examples in which the base layers 404 are formed of a polymeric and/or a plastic material, a reflective material may be applied onto upper surfaces of the base layers 404 to form the reflective ribbons 402 following the embossing of the upper surface. In examples in which the base layers 404 are formed of a metallic material, the upper surfaces of the base layers 404 may be polished, for instance, to cause the upper surfaces to be light reflective and thus form the reflective ribbons 402. In addition or alternatively to the examples discussed above, the upper surfaces of the base layers 404 may be coated with a color filter and/or a color shifting material such as a thin film interference optically variable device.

According to examples, the values of the dihedral angles formed by adjacent reflective ribbons 402 may change in a uniform manner. In these examples, each of the adjacent ones of the reflective ribbons 402 may be oriented at similar dihedral angles with respect to the base layer. In other examples, the reflective ribbons 402 may be formed such that neighboring ones of the reflective ribbons 402 have dihedral angles whose values are non-uniform with respect to the base layer. In these examples, the values of the dihedral angles of adjacent reflective ribbons 402 may change in a non-uniform manner, i.e., may be non-linearly expanding when compared to the value of the angle of adjacent reflective ribbons 402.

In FIG. 4A, the rows of reflective ribbons 402 are depicted as being formed of relatively smooth continuous surfaces such that the reflective ribbons 402 are continuously formed along each of the columns 406. As shown, the values of the dihedral angles of the reflective ribbons 402 may vary in a smooth and continuous manner along each of the respective columns 406. In FIG. 4B, the reflective ribbons 402 are depicted as being formed of planar-faceted ribbons along each of the respective columns 406, while in FIG. 4C, the reflective ribbons 402 are depicted as being formed of microstructured sections of the base layer 404. In each of FIGS. 4B and 4C, the sizes of the reflective ribbons 402 may vary in a broad range from about 1×1 µm to about 250×250 µm. In addition, the articles 400 may have other dimensions that may vary in a broad range as well. In addition, the dimensions of the articles 400 may be controlled by the appearance of an optical effect and dimensions of a security element.

Figure 4D:
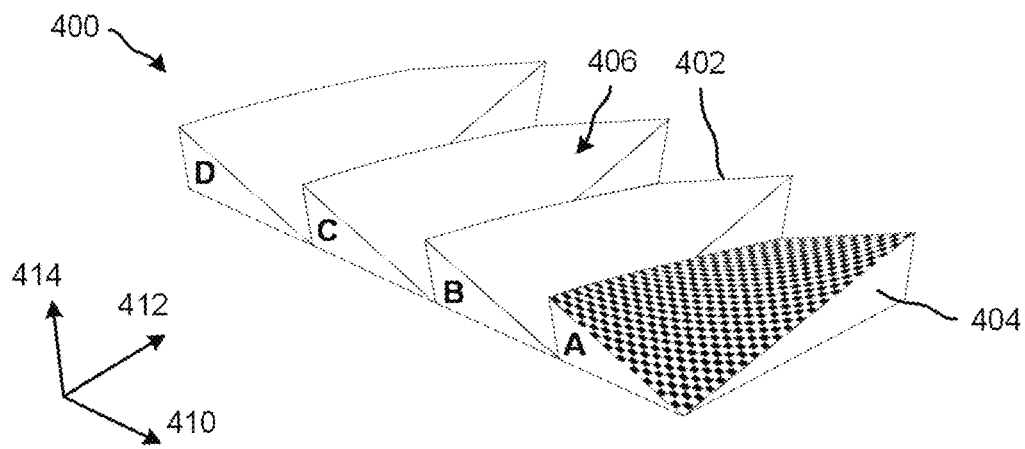
Figure 4E:
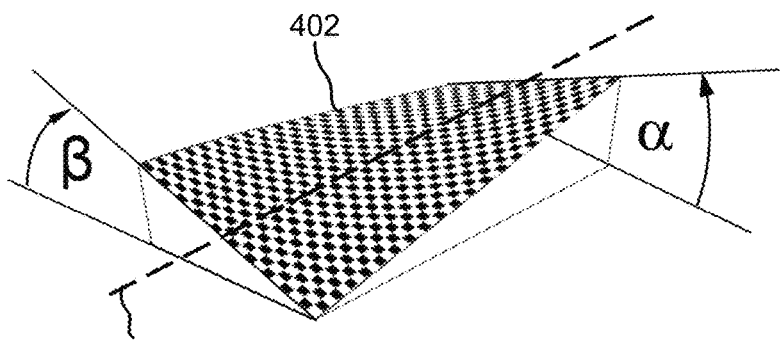

With reference now to FIG. 4D, there is shown a schematic diagram of an article 400 containing four reflective ribbons 402 (A-D), each having a helical reflective surface. The first reflective ribbon 402 (A) is shown with a checkerboard pattern to better demonstrate how the reflective surface may be curved. An enlarged version of the first reflective ribbon 402 (A) is shown in FIG. 4E. As shown, the reflective surface of the ribbon 402 may be curved or twisted to the angles α and β with respect to an axis 420. The axis 420 may be parallel to the direction 412. In addition, each of the remaining reflective ribbons 402 (B-D) in the article 400 may be similar to the first reflective ribbon 402 (A). The article 400 has been depicted as having a relatively small number of reflective ribbons 402 for purposes of simplicity and it should therefore be understood that the article 400 may include any number of reflective ribbons 402.

A security feature upon which the kinematic light (or bright) ribbon 402 may be made to be more attractive or appealing by creating the security feature to generate a synthetic kinematic image, which moves transversely within the margins of the article 400 with respect to the direction in which the article 400 is moved. By way of example, the synthetic kinematic image may be a contour of an object, a symbol, a numeral, a letter, combinations thereof, etc.

Figure 4F:
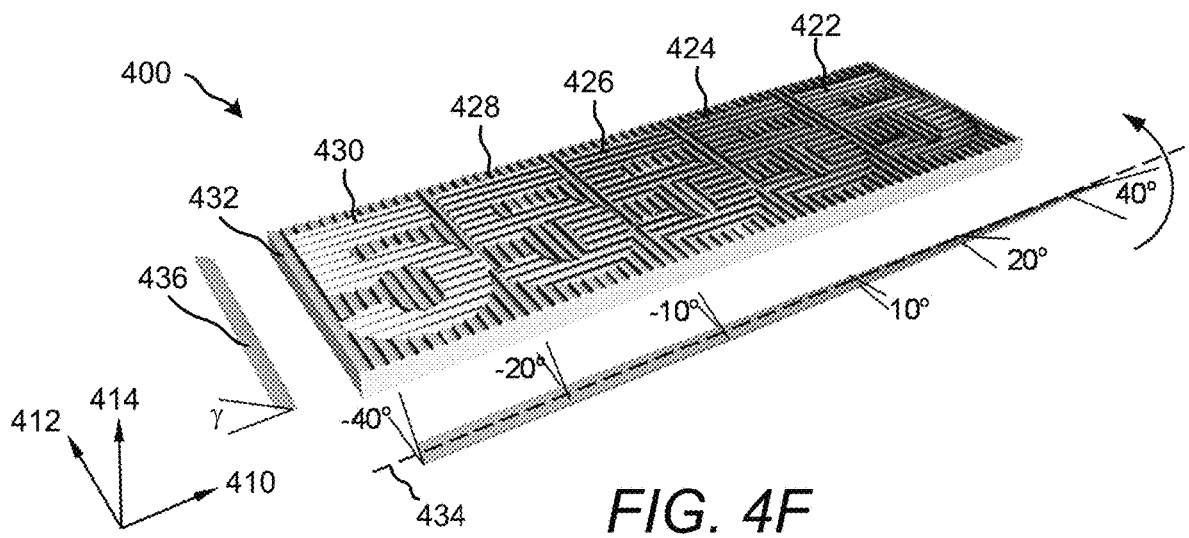
FIGS. 4F-4I, respectively, depict schematic diagrams of an article shown at different rotations with respect to each other, according to examples of the present disclosure.

An example of an article 400 containing a synthetic kinematic image, in which a plurality of a numerals are embossed onto a surface of the article 400, is depicted in FIG. 4F. The article 400 is depicted as including five numerals 422-430 and a surrounding region 432 embossed with different textures. Each of the numerals 422-430 may represent an array of micro-mirrors having a helical surface that is duplicated in the direction 412 and shaped as the numeral 5. The outlines of each of the numerals 422-430 are depicted as being the same along with the rotations of the surfaces of the micro-mirrors in the direction 412. However, the rotation angles of the surfaces of the micro-mirrors on the numerals 422-430 around the axis 434, which is parallel to the direction 410, may differ from the rotation angles of the other numerals 422-430. For instance, the rotation angle of the right side of the surface of the numeral 422 in the 412-414 plane is depicted as being 40°. The rotation angle of the left side of the same numeral 422 in the 412-414 plane is depicted as being 20°. The rotation angles of the remaining numerals may also vary along the direction 410 and the tendency for different angles of rotations in the surfaces of the numerals 422-432 may be traced down FIG. 4F.

The structure of the surrounding region 432 may be different from the structures of the surfaces forming the numerals 422-430. For instance, the surrounding region 432 may have a pyramidal texture, an irregular or grated texture, or the like. The purpose of the surrounding region 432 may be to scatter incident light or to reflect incident light in a direction that differs from the directions of reflection of the micro-mirrors in the numerals 422-430. According to examples, the texture of the surrounding region 432 may be made with a blazed grating and by duplicating a grating 436 in the direction 410. The grating 436 may have an angle γ that may remain the same across the article 400 in the surrounding region 432. In this regard, the surrounding region 432 may serve as a background for the numerals 422-430, for instance, to cause the numerals 422-430 to be more readily visible.

Figure 4G:
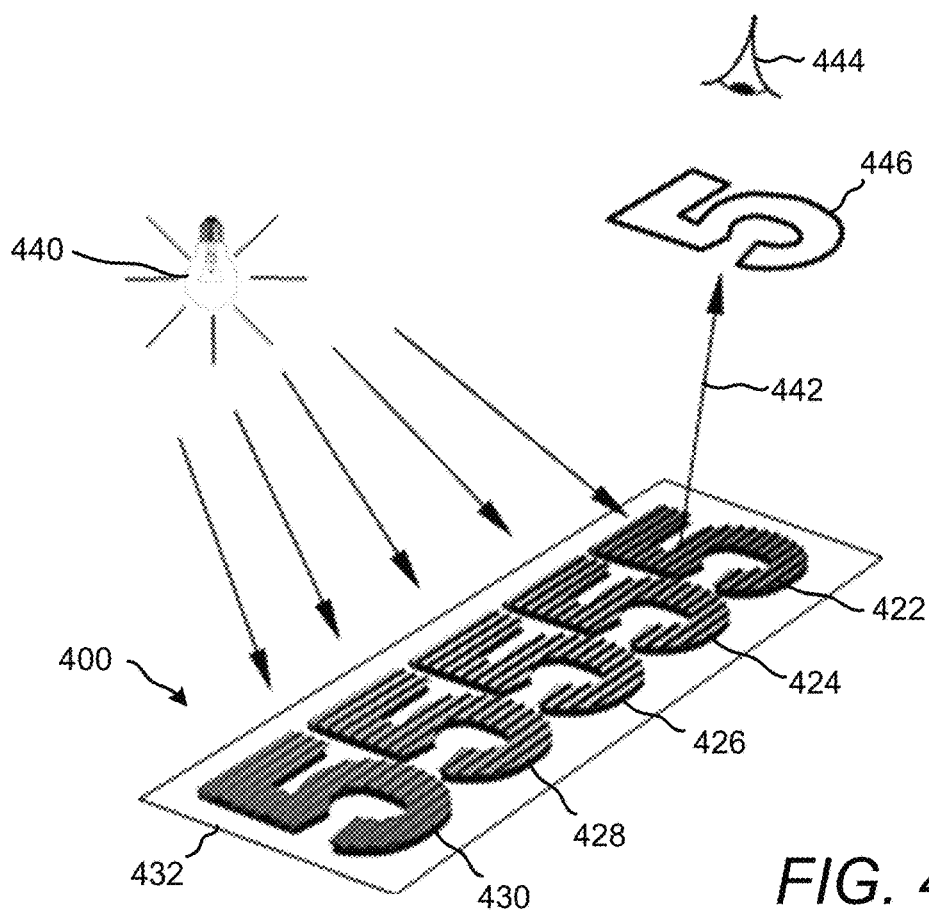

With reference now to FIG. 4G, there is shown a schematic diagram of the article 400 depicted in FIG. 4F. Particularly, FIG. 4G depicts an example in which light from a light source 440 illuminates the article 400 while the article 400 is in a first rotational position. In the rotational position shown in FIG. 4G, light from the light source 440 may reflect from the first numeral 422 as indicated by the arrow 442 toward an observer 444 such that the observer 444 sees the synthetic image 446 of the first numeral 422. In addition, the light may not reflect from the surrounding region 432 to the observer 444.

Figure 4H:
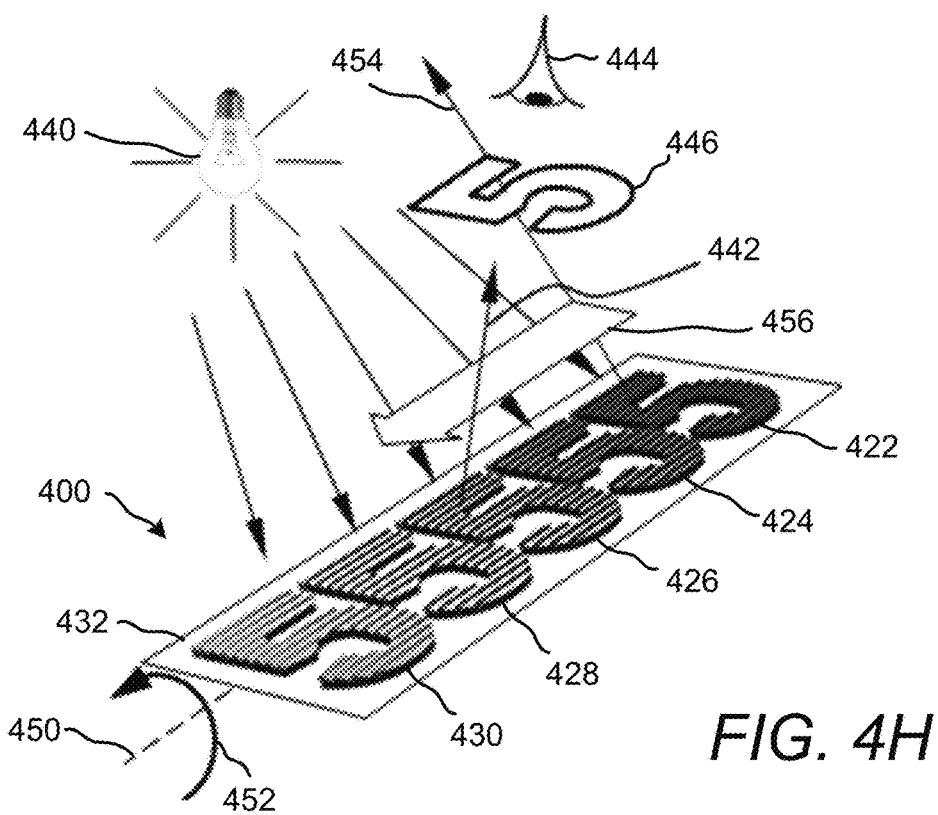

Turning now to FIG. 4H, there is shown a schematic diagram of the article 400 depicted in FIG. 4G, in which the article 400 is rotated. As shown, the article 400 is depicted as being rotated about an axis 450 as depicted by the arrow 452. Rotation of the article 400 may cause the light from the light source 440 to reflect from the third numeral 426 as indicated by the arrow 442 toward the observer 444 such that the observer 444 sees the synthetic image 446 of the third numeral 426. In addition, the first numeral 422 may now reflect light in the direction indicated by the arrow 454, which is a direction that is away from the observer 444. As such, for instance, the synthetic image 446 has now shifted to the left along the direction indicated by the arrow 456, which may create the illusion of motion of the numeral 446 to the observer 444.

Figure 4I:
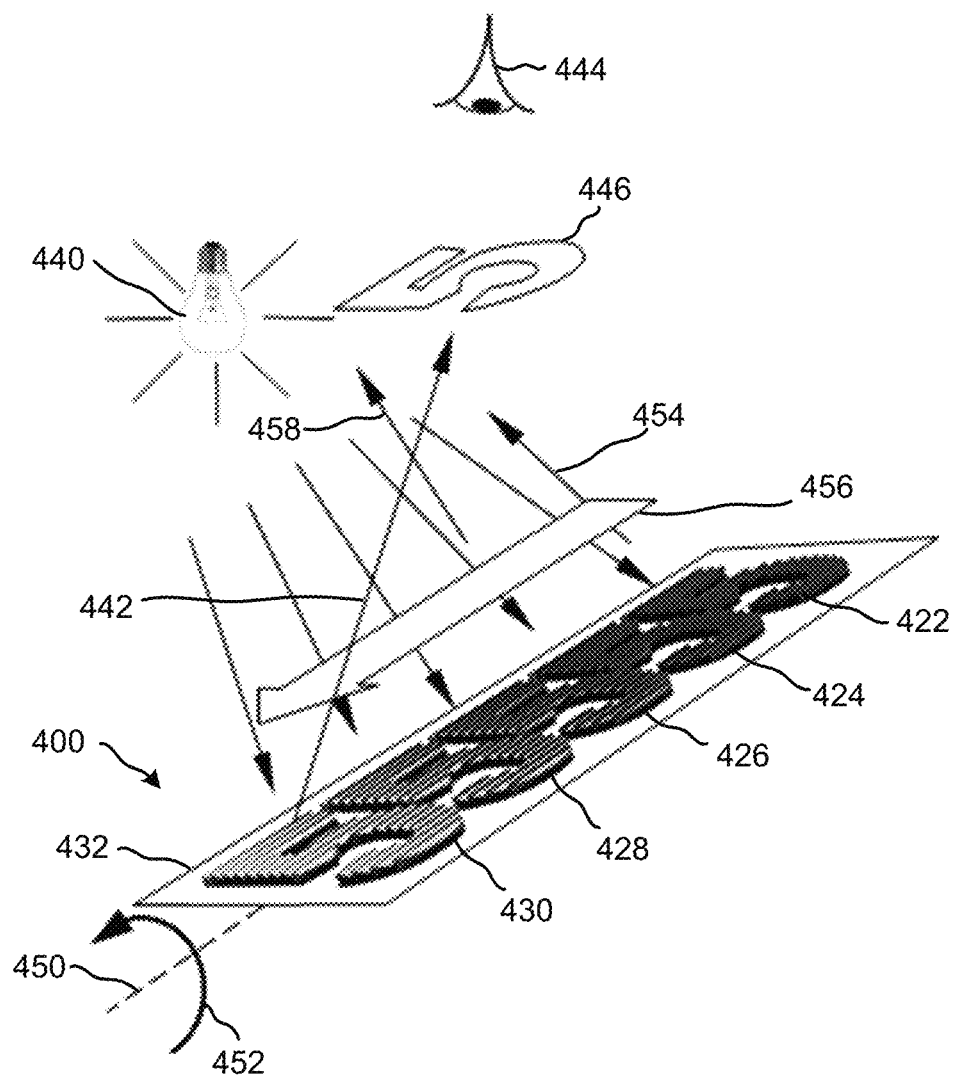

Turning now to FIG. 4I, there is shown a schematic diagram of the article 400 depicted in FIGS. 4G and 4H, in which the article 400 is rotated further. As shown, the article 400 is depicted as being rotated about the axis 450 as depicted by the arrow 452. Further rotation of the article 400 as shown in FIG. 4I may cause the light from the light source 440 to reflect from the fifth numeral 430 as indicated by the arrow 442 toward the observer 444 such that the observer 444 sees the synthetic image 446 of the fifth numeral 430. In addition, the first numeral 422 may now reflect light in the direction indicated by the arrow 454 and the third numeral 426 may now reflect light in the direction indicated by the arrow 458, which are directions that are away from the observer 444. As such, the synthetic image 446 has now shifted further to the left along the direction indicated by the arrow 456, which may further create the illusion of motion of the numeral 446 to the observer 444.

According to examples, articles 400 containing arrays of reflective ribbons 402 and/or micro-mirrors as shown in FIGS. 4A-4I may be implemented in the fabrication of optical security elements for banknotes and/or other valuable documents, such as credit cards, authentic software documentation, etc. By way of example, a difference between optical security elements having arrays of reflective ribbons 402 disclosed herein and other optical security elements is that the optical security elements disclosed herein may generate ortho-parallactic movement of the optical effect as the optical security element is tilted up or down (or from side to side, diagonally, etc.). Arrays of reflective ribbons 402 produced by an embossing technique may be used for the fabrication of security threads. A fragment of such a thread is demonstrated in FIGS. 5A and 5B.

Figure 5B:
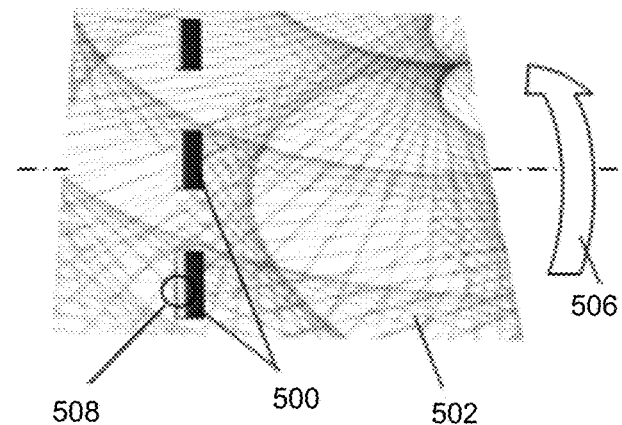

As shown in FIGS. 5A and 5B, a security thread 500 is depicted as being placed on a top portion of a banknote 502. FIG. 5A depicts the security thread 500 at a near-normal observation angle. As shown in FIG. 5A, a reflected shape 504 of light is adjacent to the right side of the security thread 500. When the banknote 502 is tilted away from the observer in the direction 506 as shown in FIG. 5B, the bright shape moves to the left edge 508 of the security thread 500.

According to examples, the security thread 500 may include an article 400 containing reflective ribbons 402 arranged in any of the manners shown in FIGS. 4A-4I. The security thread 500 may also be colored by applying a layer of colored varnish over the top of the security thread 500, by deposition of thin film interference structures, or the like, to make the security thread 500 color-shifting. In examples, arrays of helical reflective segments may be manufactured as pixelated structures bearing embossed micro-structures generating reflected light in a form of an image, e.g., a logo, a symbol, a shape, or another type of image that moves orthogonally when the article is tilted with respect to the observer as discussed above with respect to FIGS. 4F-4I. In addition or other examples, arrays of helical reflective segments may be manufactured as pixelated structures bearing embossed planar ribbons generating reflected light in a form of an image, e.g., a logo, a symbol, a shape, or another kind moving orthogonally along an axis of rotation when the article is tilted forth and back around said axis of rotation.

Figure 6:
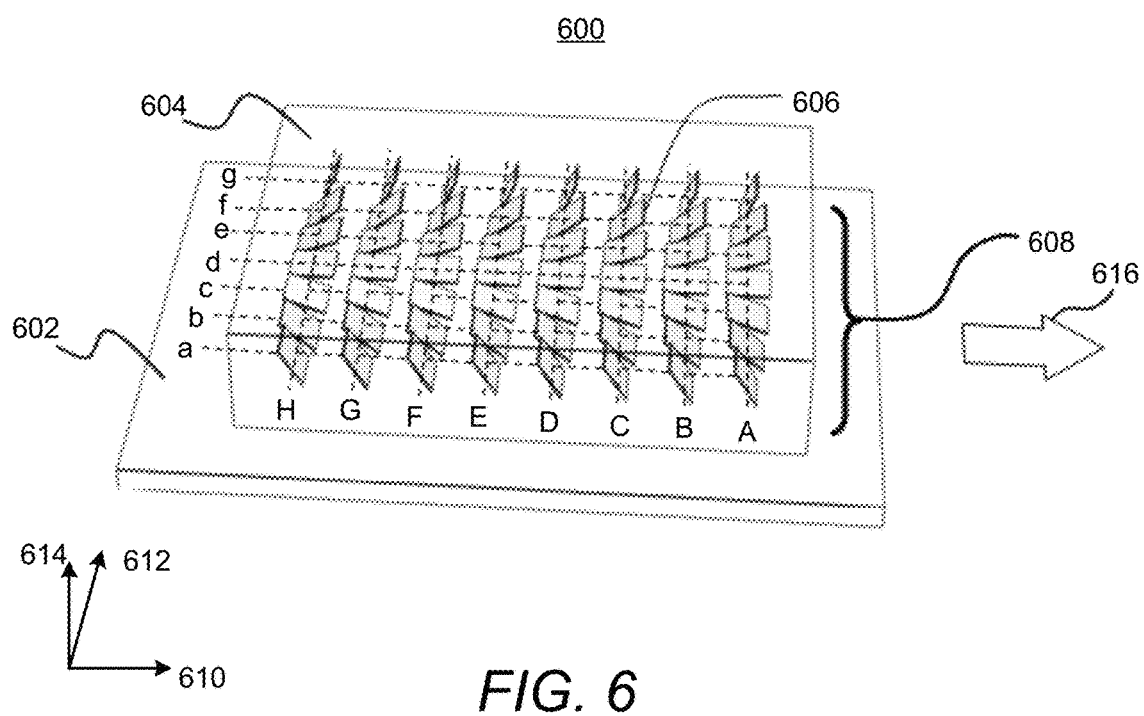
FIG. 6 depicts a perspective view of an article that exhibits ortho-parallactic optical effects, according to an example of the present disclosure.

According to other examples, articles, e.g., optical security elements, disclosed herein may include magnetically-orientable flakes aligned in an external magnetic field to form an array of micro-mirrors that exhibits an optical effect with ortho-parallactic movement of a reflected light. An example of such an article 600 is depicted in FIG. 6. The article 600 is depicted as including a substrate 602, which may be paper, plastic, or other type of material. The substrate 602 may be coated with a layer 604 of security ink printed on the substrate 602 through application of a suitable technique. For instance, the layer 604 may be applied onto the substrate 602 through use of an inkjet printer, via an ink roller, or the like. In any regard, the layer 604 may include magnetically-orientable flakes 606 dispersed in the layer 604, in which the magnetically-orientable flakes 606 may be reflective.

According to examples, while the layer 604 is in a liquid state, the article 600 may be passed through a magnetic field and when sections of the magnetically-orientable flakes 606 are positioned within portions of the magnetic field having desired magnetic field direction, radiation may be applied onto the layer 604 to cure or dry the liquid layer 604. That is, while the layer 604 is in the liquid state, the magnetically-orientable flakes 606 may become substantially aligned with the desired magnetic field direction and curing of the layer 604 may lock the magnetically-orientable flakes 606 at the angles at which the magnetically-orientable flakes 606 have become oriented. The magnetically-orientable flakes 606 at various locations in the layer 604 may be locked into desired orientations through use of a radiation blocking mask having at least one opening positioned between a radiation source and the article 600. That is, radiation may be selectively applied onto the layer 604 to selectively lock in the magnetically-orientable flakes 606 at the desired orientations without locking in other magnetically-orientable flakes 606 that have not been oriented to desired angles.

According to examples, the layer 604 may be cured as the layer 604 is positioned with respect to a magnetic field such that at least a majority of the magnetically-orientable flakes 606 in the layer 604 are arranged as shown in FIG. 6. That is, for instance, the layer 604 may extend along a first dimension 610 and a second dimension 612, in which the second dimension 612 is perpendicular to the first dimension 610. In addition, the magnetically-orientable flakes 606 may be dispersed in the layer 604 and at least a majority of the magnetically-orientable flakes 606 positioned along a common plane extending in the second dimension 612 have dihedral angles relative to the plane of the substrate 602 that follow a helical arrangement along the second dimension 612.

In FIG. 6, the magnetically-orientable flakes 606 are depicted as being arranged in the layer 604 along longitudinal rows of an array of magnetically-orientable flakes 606 in a region 608. As shown, all of the magnetically-orientable flakes 606 in each of the rows "a-g" may be oriented at the same dihedral angle with respect to the major plane of the substrate 602. That is, all of the magnetically-orientable flakes 606 in row "a" may be oriented at the same angle $\alpha_a$ with respect to the major plane of the substrate 602 and the direction of substrate motion 616, in which the angle $\alpha_a$ is between about $90°<\alpha_a<180°$. Likewise, the magnetically-orientable flakes 606 in row "b" may be oriented at the same angle $\alpha_b$ with respect to the major plane of the substrate 602 and the direction of substrate motion 616, in which the angle $\alpha_b$ differs from the angle $\alpha_a$. The angle of tilt of the magnetically-orientable flakes 606 in the remaining rows c-g may also differ from the tilt angles of the magnetically-orientable flakes 606 in the other rows.

In FIG. 6, the magnetically-orientable flakes 606 are also depicted as being arranged in the layer 604 along transverse columns of an array in the region 608. The values of the tilt angles of the magnetically-orientable flakes 606 along each of the transverse columns "A"-"H" vary in a step-wise fashion. For instance, the values of the tilt angles in the transverse columns "A"-"H" change from the value of angle $\delta_1$ (shown in FIG. 6 as being in the range $180°>\delta_1>90°$) to the angle $\delta_n$ (shown in FIG. 6 as being in the range $90°>\delta_n>0°$). As a result of this variation in the value of tilt angles along a string of magnetically-orientable flakes 606 in a single transverse column "A", the magnetically-orientable flakes 606 may form a helical orientation along the direction perpendicular to the direction of motion 616 and lying within the plane of the substrate 602.

According to examples, the article 600 containing the magnetically-orientable flakes 606 may be implemented in the fabrication of optical security elements for banknotes and other valuable documents, such as credit cards, authentic software documentation, etc.

Generally speaking, the articles 400 and 600 disclosed herein may produce an ortho-parallactic optical effect. When an article of value containing a security element, such as an article 400, 600, is tilted in a certain way (and thereby rotated around a chosen axis), the ortho-parallactic optical effect provides apparent movement of the reflected light along the chosen axis. In the examples of FIGS. 4A-4I, tilting of the article of value around the 412 axis (tilting by a forth and back motion in the 410-414 plane), the viewer looking towards the first direction 410 sees the ortho-parallactic optical effect moving left-to-right or right-to-left. An example of a security element with the ortho-parallactic optical effect is demonstrated in the following figures. The security element may include one of the articles 400, 600 discussed above.

Figure 7A:
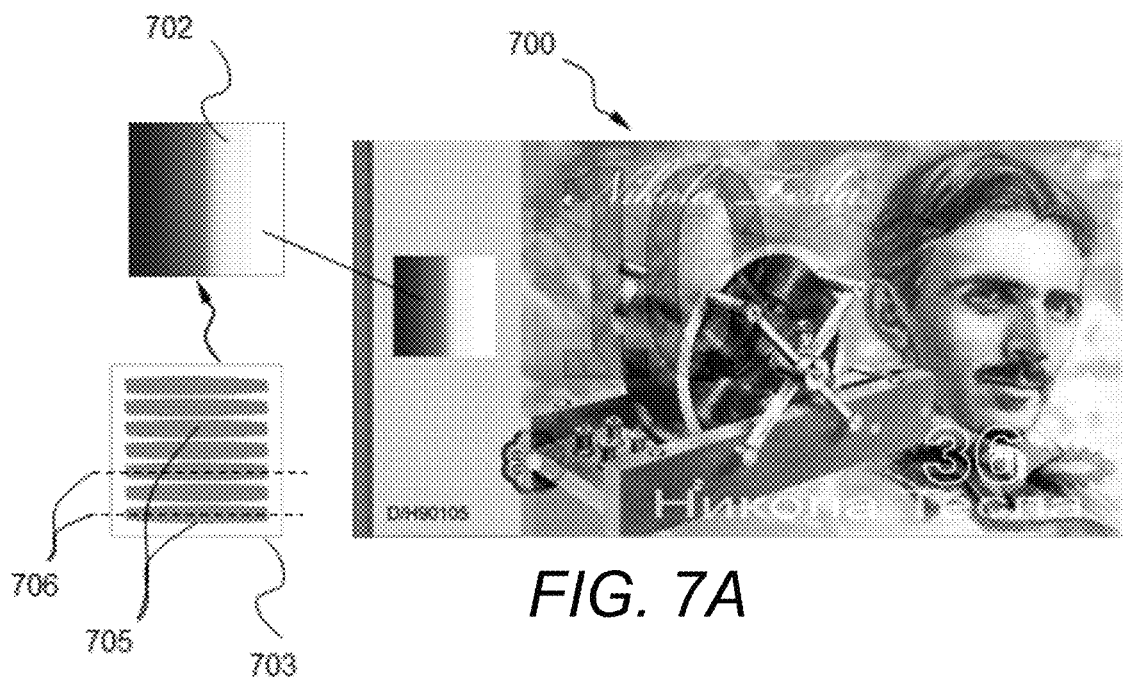
FIGS. 7A, 7C, and 7E, respectively, show an article of value having a security element at various tilt angles, according to an example of the present disclosure.
Figure 7B:
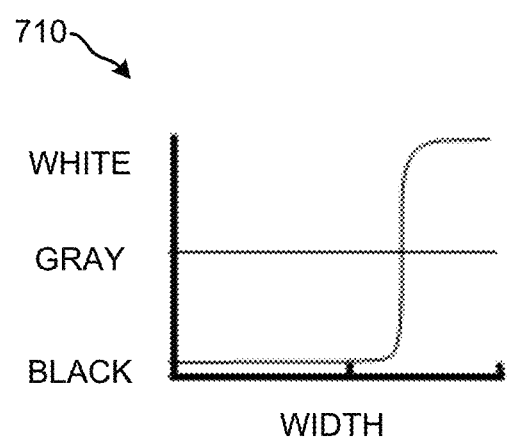
FIGS. 7B, 7D, and 7F, respectively, show lightness plots corresponding to the security element shown in one of FIGS. 7A, 7C, and 7E, according to an example of the present disclosure.

With reference to FIG. 7A, there is shown an article of value 700, in this case a banknote, having a rectangular-shaped security element 702. It should be noted that the security element 702 is merely exemplary and is not limited to rectangular-shaped or use with bank notes or as a security element. For example, the security element 702 may be used on any article, including but not limited to, labels, packaging, advertisements, etc. and may have any shape. As shown in the diagram 703, the security element 702 may schematically be represented with magnetically-orientable flakes aligned in "twisted ribbons" 705, in which the axes 706 of rotation of the ribbons 705 are parallel to the lower side of the security element 702. The security element 702 may be one of the articles 400, 600 discussed above. As shown, the left region of the security element 702 appears dark and the right region appears bright. The locations of the bright and dark regions in the security element 702 are represented in the lightness graph 710 depicted in FIG. 7B. As shown in FIG. 7B, the lightness of the security element 702 has a peak corresponding to the reflective shape of the feature.

Figure 7C:
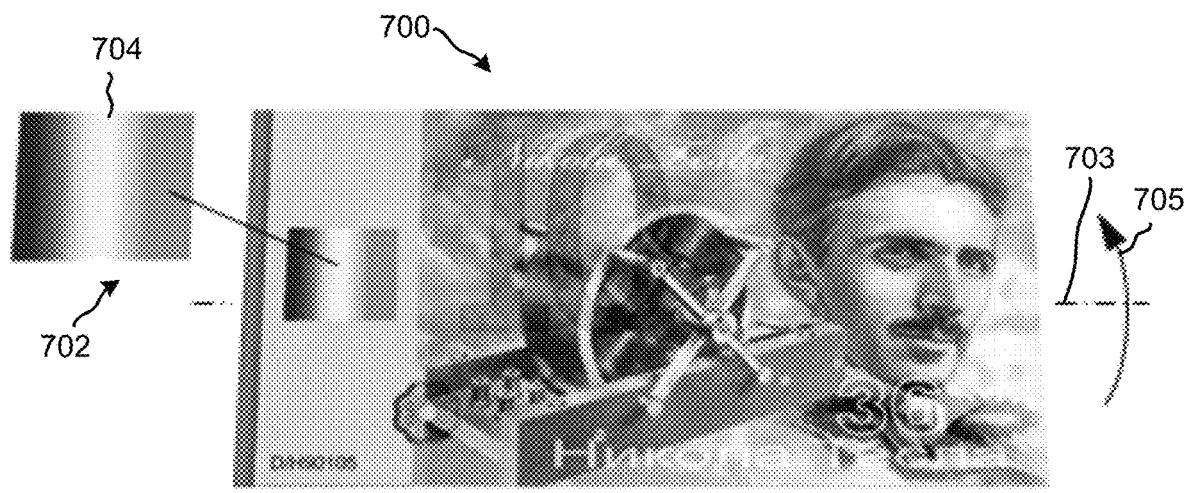
Figure 7D:
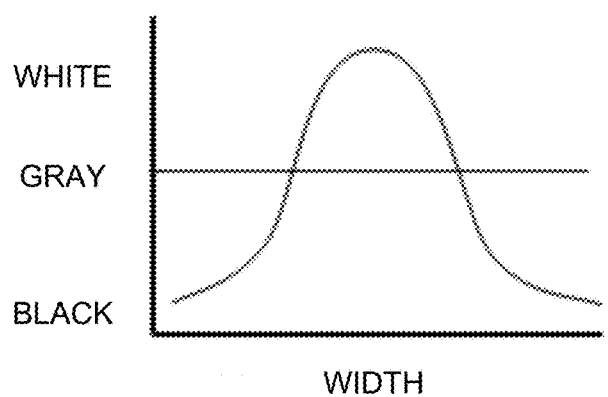

In examples, tilting of the article of value 700 as shown in FIG. 7C with the upper edge tilted to about 2°-25° away from the observer (rotation of the article of value 700 around its horizontal axis 703 as denoted by the arrow 705) may move a reflective shape or image 704 from the right edge of the security element 702 to the center as shown in FIG. 7C. This movement is illustrated in a comparison between the lightness graph 720 in FIG. 7D and the lightness graph 710 in FIG. 7B. In some examples, this movement may appear continuous.

Figure 7E:
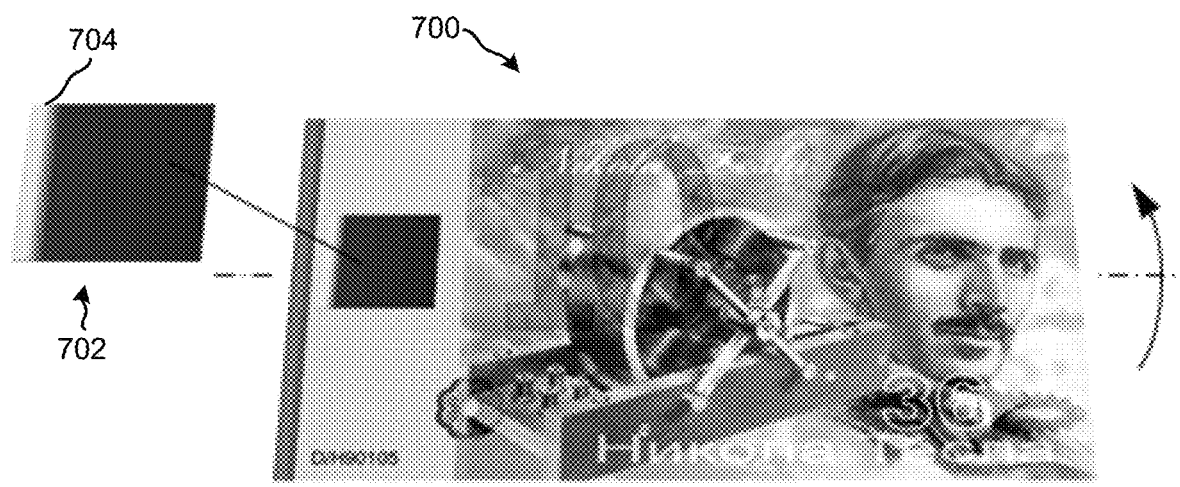
Figure 7F:
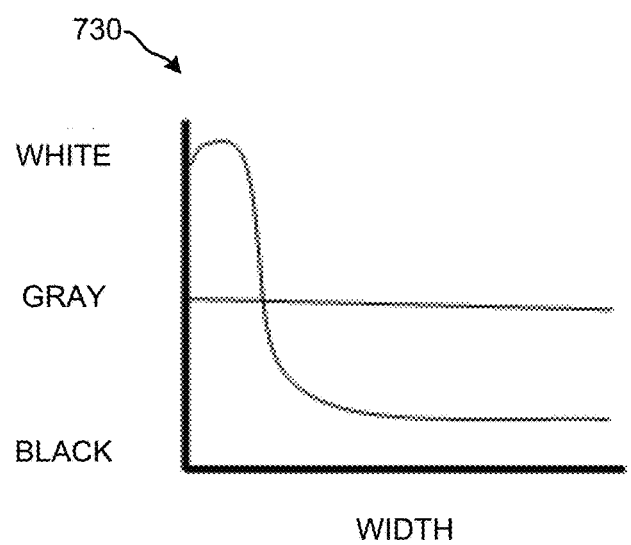

A further increase of the tilt angle (rotation angle about the horizontal axis) causes the bright reflective shape or image 704 to traverse to the left edge of the security element 702 as demonstrated in FIG. 7E. The lightness graph 730 in FIG. 7F shows that the peak of the lightness is located near the left edge of the security element 702 when the article of value 700 is viewed at that specific tilt angle.

Figure 8A:
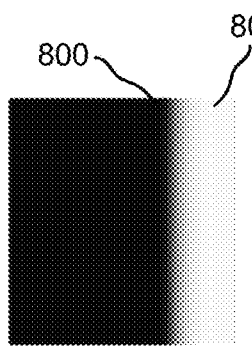
FIGS. 8A-8C, respectively, show a security element at various tilt angles, according to an example of the present disclosure.
Figure 8B:
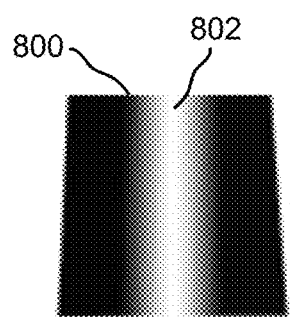
Figure 8C:
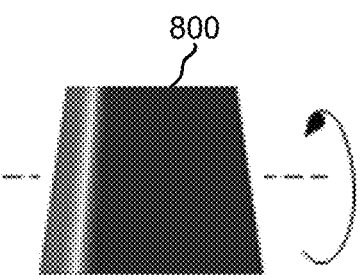
Figure 8D:
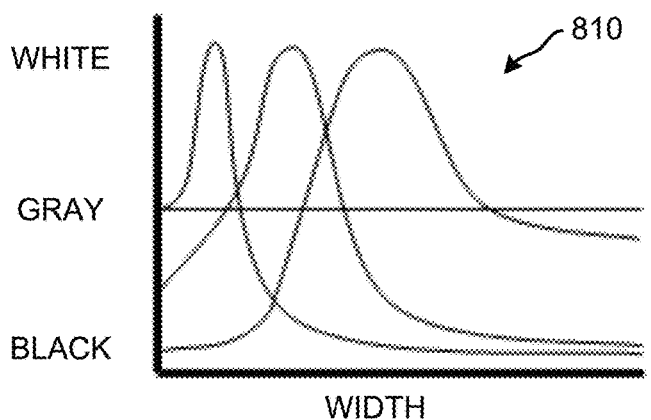
FIG. 8D shows a lightness plot corresponding to the security element shown in FIGS. 8A-8C, according to an example of the present disclosure.

The dynamic character of an example of the ortho-parallactic optical effect at different image tilt angles is summarized with respect to the image 800 depicted in FIGS. 8A-8C. The image 800 in FIG. 8A may correspond to an observation angle that is approximately normal (perpendicular) to the image 800. As shown, a bright shape or band 802 may be visible at the right side of the image 800. FIG. 8B shows the upper edge of image 800 being tilted by 10° away from the observer, while FIG. 8C shows the upper edge of image 800 being tilted by 25° away from the observer (image 800 has been rotated around the horizontal axis). As shown in FIGS. 8B and 8C, the bright shape or band 802 may appear to travel from the right side of the image 800 to the left side of the image 800 as the upper edge of image 800 is tilted away from the observer. The bright shape or band 802 may thus follow an ortho-parallactic trajectory with respect to the rotation of the image 800 around a specific axis. The ortho-parallactic right-to-left travel of the bright shape or band 802 in the image 800 illustrated in FIGS. 8A-8C is demonstrated graphically in the lightness plot 810 depicted in FIG. 8D.

Figure 9:
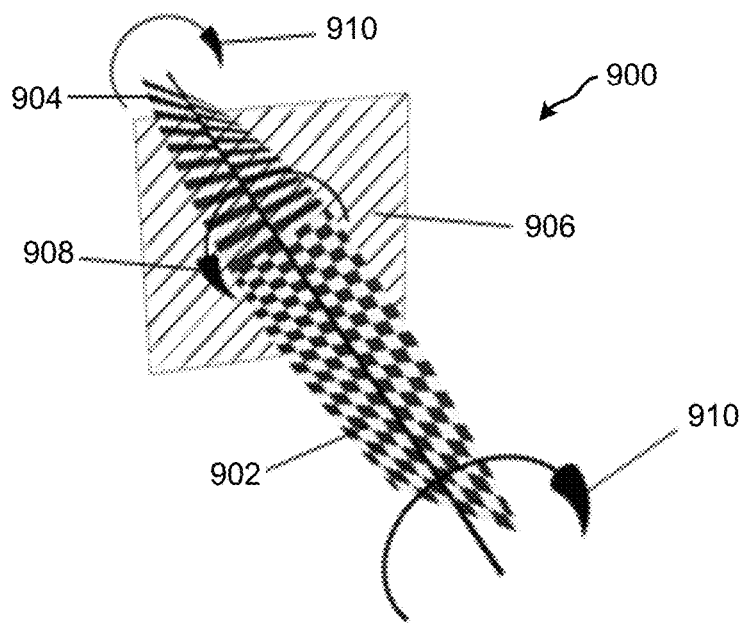
FIG. 9 shows an array of reflective segments with reflective symmetry, according to an example of the present disclosure.

The ortho-parallactic optical effect demonstrated in the examples of FIGS. 3, 5, 7, and 8 have been generated with reflective ribbons 402, 606 arranged in relatively simple arrays. In other examples, different ortho-parallactic optical effects may be generated by other types of reflective ribbon arrays, such as two helical arrays of the reflective ribbons 402, 606 whose helix behavior is symmetric about a dividing plane. Symmetry about a plane may be akin to an object and the object's planar reflection, which may be called the reflection or mirror symmetry. An example of an array 900 of reflective ribbons 402, 606 with reflective symmetry is shown schematically in FIG. 9. The array 900 of reflective segments 402, 606 with the reflective symmetry shown in FIG. 9 includes two parts 902 and 904. The first part 902 is filled with a checkerboard pattern and the second part 904 is filled with a zebra pattern to better distinguish these parts from each other. The parts 902 and 904 are depicted as being symmetric relative to a plane 906. Adjacent to the plane 906, edges of the parts 902 and 904 are shown as being rotated counterclockwise in the plane 906 in the direction 908. The outer edges of the parts 902 and 904 are depicted as being rotated clockwise in the direction 910. The respective angles of rotation of the parts 902 and 904 in the direction 910 may be the same as—or may be different from—each other.

Figure 10:
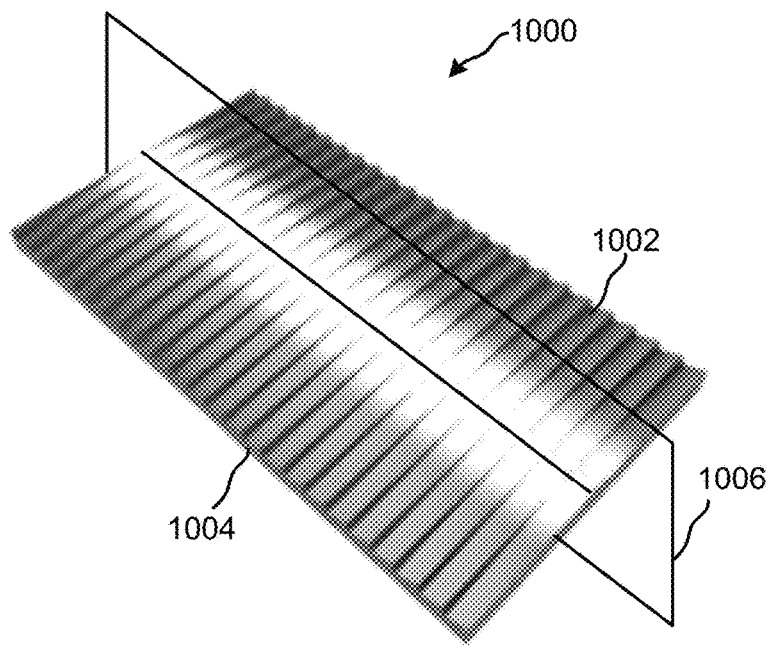
FIG. 10 shows a perspective view of an article formed of an array of reflective ribbons provided on a base layer having reflective symmetry, according to an example of the present disclosure.
Figure 11:
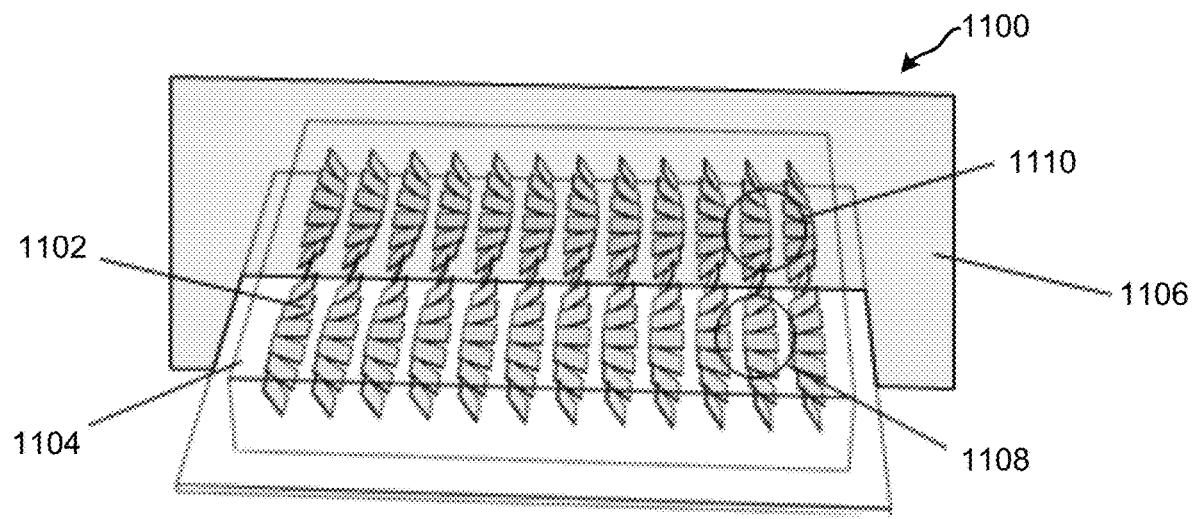
FIG. 11 shows a perspective view of an article containing magnetically-orientable flakes oriented in reflective symmetry, according to an example of the present disclosure.

An example of an article 1000 formed of an array of reflective ribbons 1002 provided on a base layer 1004 having reflective symmetry about a plane 1006 is depicted in FIG. 10. The article 1000 may be similar to the article 400 depicted in FIG. 4A. An example of an article 1100 containing magnetically-orientable flakes 1102 dispersed in a layer 1104, which may be an organic binder, is depicted in FIG. 11. As shown, the magnetically-orientable flakes 1102 may have been oriented to be in reflective symmetry about a plane 1106 through placement of the article 1100 in portions of a magnetic field having desired vector force angles and through application of radiation when the magnetically-orientable flakes 1102 are substantially aligned with the desired vector force angles, e.g., within +/−1°. The magnetically-orientable flakes 1102 in the regions 1108 and 1110 of the article 1100 are depicted as being in reflectional symmetry relative to each other with respect to the plane 1106, which is normal to the major surface of the layer 1104. The region 1110 of article 1100 may be similar to the article 600 depicted in FIG. 6.

Figure 12A:
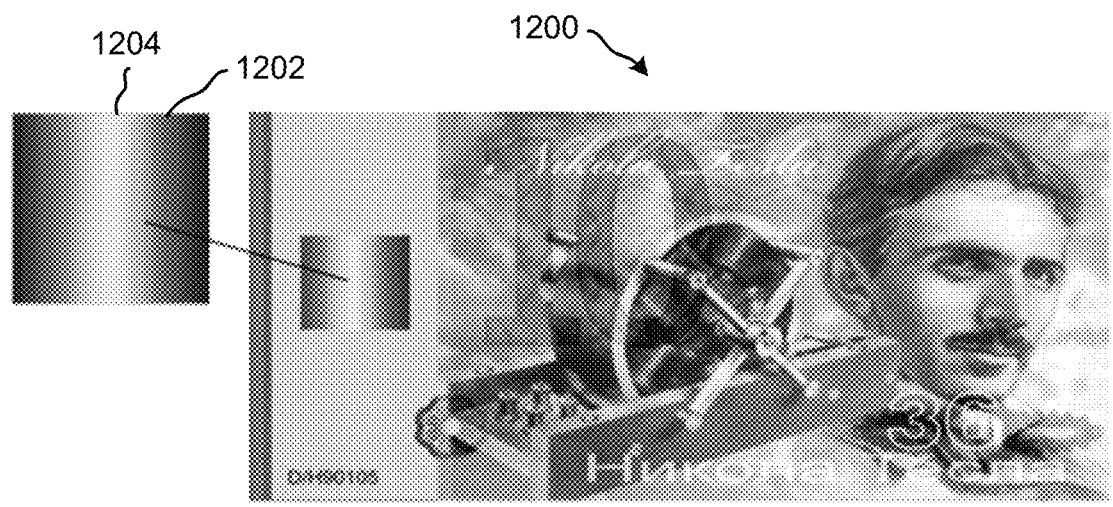
FIGS. 12A, 12C, and 12E, respectively, depict an article of value having a security element at various tilt angles, according to an example of the present disclosure.
Figure 12B:
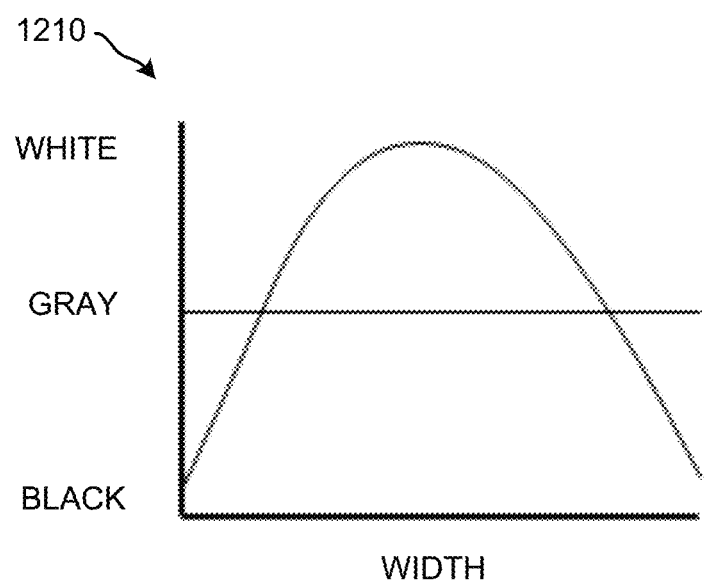
FIGS. 12B, 12D, and 12F, respectively, show lightness plots corresponding to the security element shown in one of FIGS. 12A, 12C, and 12E, according to an example of the present disclosure.

The ortho-parallactic optical effects produced by the articles 1000 and 1100 with reflectional symmetry may be different from the ortho-parallactic optical effects illustrated in FIGS. 7A-7F. Visually, the appearance of the ortho-parallactic optical effect may appear as a reflective shape or image in the middle of the printed feature at a normal observation angle. An example of this ortho-parallactic optical effect is shown and described with respect to FIGS. 12A-12F. In FIG. 12A, there is shown an article of value 1200, in this case a banknote, having a rectangular-shaped security element 1202. The security element 1202 may include one of the articles 1000, 1100 discussed above. As shown, a bright shape or image 1204 may be visible on the security element 1202 when viewed at an observation angle normal to the surface. The location of the bright shape or image 1204 in the security element 1202 is represented in the lightness graph 1210 depicted in FIG. 12B. As shown in that figure, the lightness of the security element 1202 exhibits a broad maximum (e.g., at least 50% the width of the security element 1202) on the curve across the width of the security element 1202. In examples, the shape or image 1204 may be relatively wider than the shape or band 704 shown in FIGS. 7A, 7C, and 7E.

Figure 12C:
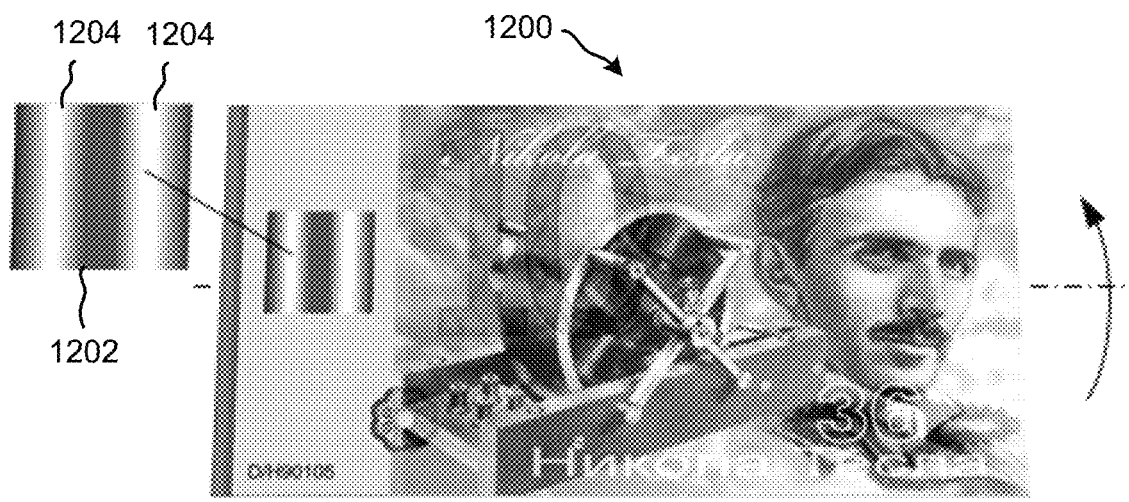
Figure 12D:
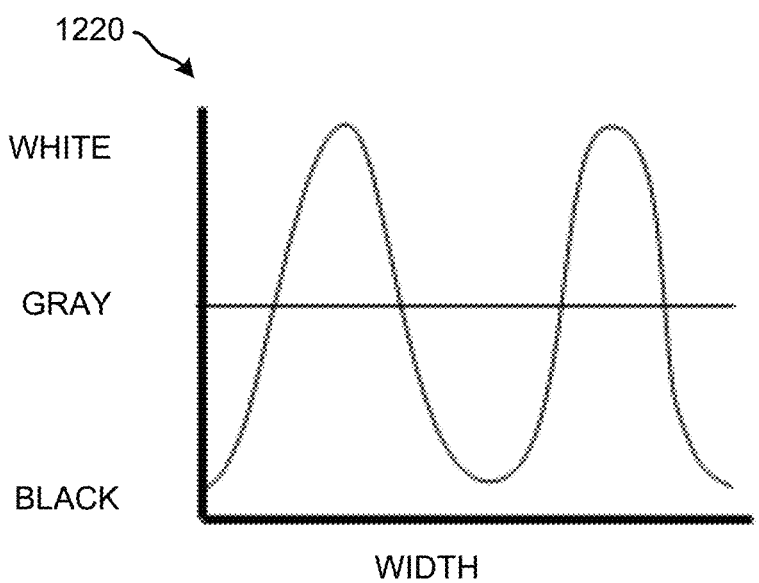

A 10° tilt of the article of value 1200 is shown in FIG. 12C, in which the upper edge of the article of value 1200 is moved away from the observer. As shown, tilting in this manner may produce a split of the bright shape or image 1204, observed in the middle of the security element 1202, into two bright shapes or images 1204 of a lesser width that simultaneously move to the left and right edges of the security element 1202, respectively, (which may equivalently be called an optical element). A plot 1220 of the lightness of the security element 1202 shown in FIG. 12C is depicted in FIG. 12D and demonstrates the appearance of two peaks on the curve at that angle of tilt.

Figure 12E:
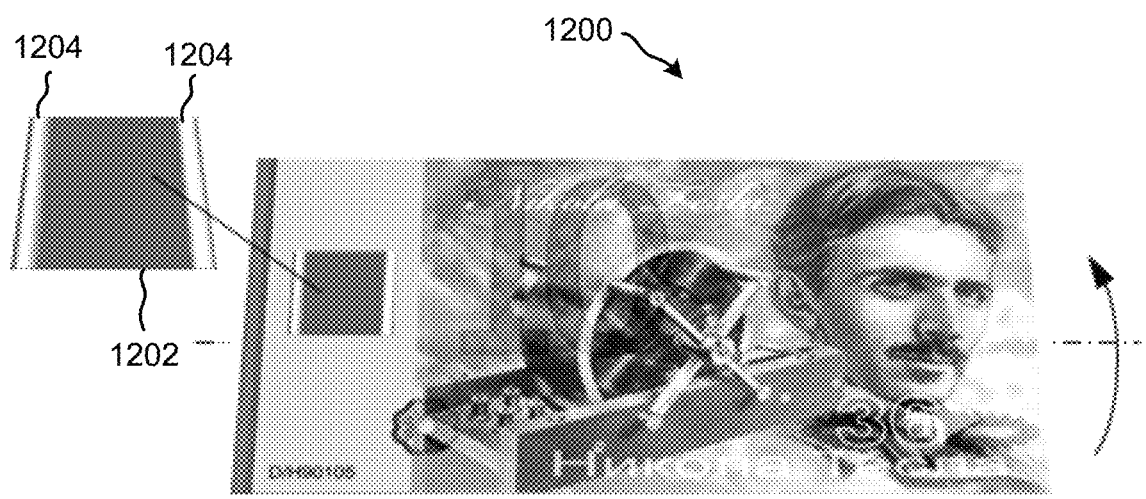
Figure 12F:
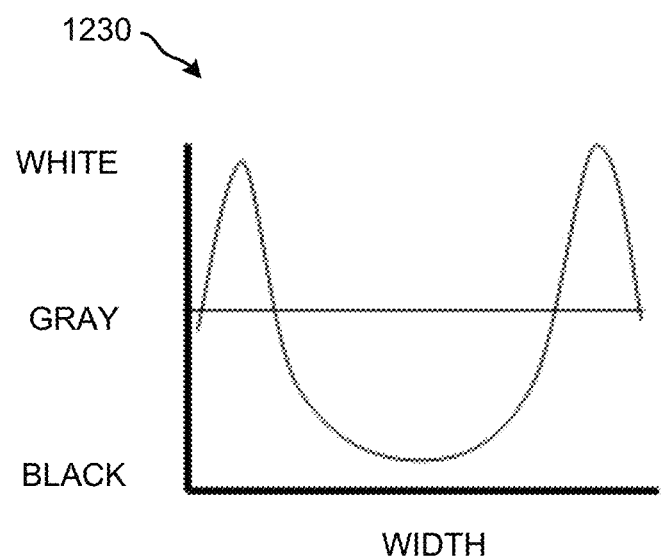

As shown in FIG. 12E, a further tilt of the upper edge of the article of value 1200 to a higher angle away from the observer may cause a wider spread of the bright shapes from each other and may cause the bright shapes 1204 to become narrower near the left and right edges of the security element 1202 accompanied by a widening of a dark zone in the middle of the security element 1202. A plot 1230 of the lightness of the security element 1202 shown in FIG. 12E at this particular angle of tilt is depicted in FIG. 12F and shows this optical effect. If the upper edge of the article of value 1200 is tilted back towards the observer, it may cause the two bright shapes or images 1204 shown in FIG. 12E to be collapsed back into a single shape—when the tilt angle comes close to 0°, for instance, as shown in FIG. 12A. In the examples of FIGS. 12A-12F, the upper edge was tilted forth and back by rotating the article of value 1200 around the horizontal axis.

Figure 13:
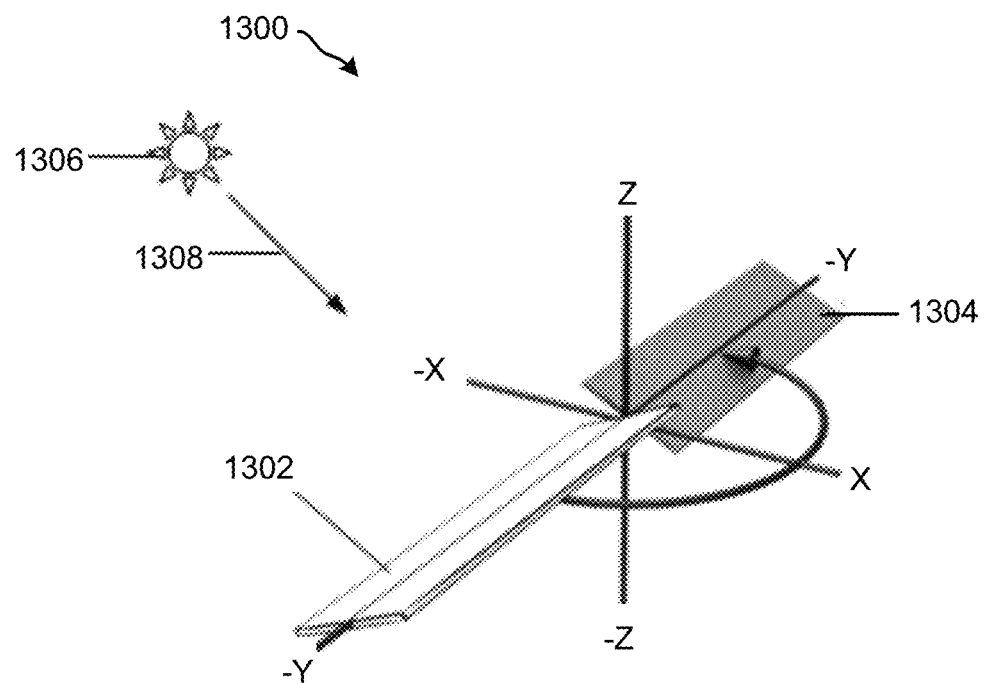
FIG. 13 shows a perspective view of a simple layout of reflective surfaces having rotational symmetry with respect to each other, according to an example of the present disclosure.

As may be seen from FIGS. 7A-7F and 12A-12F, a characteristic of the movement of a zone of light reflected from the articles 400, 600, 1000, 1100 in the form of a bright shape or image, is a smooth motion from one edge of article 400, 600, 1000, 1100 or a smooth split of a single bright shape in two. However, an instant ON and OFF switch of reflectance in the article 400, 600, 1000, 1100 may be possible with articles having different features. In a simple layout, the article 400, 600, 1000, 1100 may appear as an external version of a helical mirror where a predetermined percentage of the area of the mirror is covered with planar ribbons inclined to the substrate at a first dihedral angle (a first region) and a second percentage of the surface is covered with planar ribbons inclined to the substrate at a second and different angle (a second region). In an example, these regions demonstrate a rotational symmetry with respect to the Z axis of the Cartesian coordinates (a line normal to the surface). An example of this simple layout 1300 is schematically depicted in FIG. 13. A first planar surface 1302 in FIG. 13 is rotated 180° around the Z axis in order to be rotationally symmetric to a second planar surface 1304.

As shown in FIG. 13, light from a light source 1306 may illuminate the first planar surface 1302 along a direction 1308. The first planar surface 1302 may appear bright because the first planar surface 1302 reflects the light toward the observer. In contrast, the second planar surface 1304, which is off the angle of reflection to the light source 1306, may appear dark to the same observer.

Figure 14A:
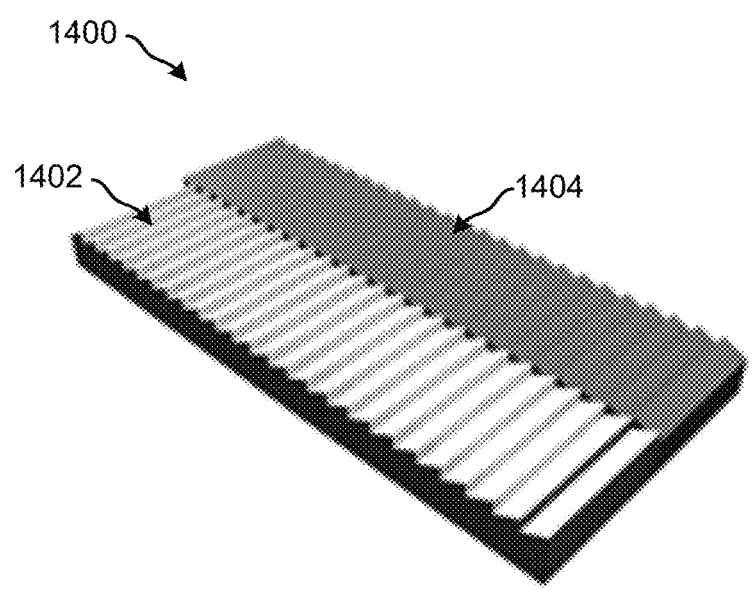
FIG. 14A shows a perspective view of an article having a first set of reflective surfaces and a second set of reflective surfaces oriented with a rotational symmetry to each other, according to an example of the present disclosure.
Figure 14B:
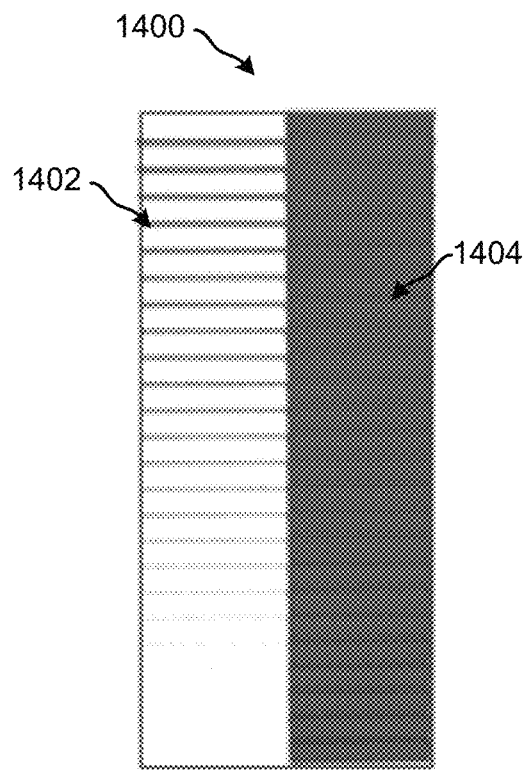
FIGS. 14B and 14C, respectively, show views of the article depicted in FIG. 14A at different tilt angles, according to an example of the present disclosure.
Figure 14C:
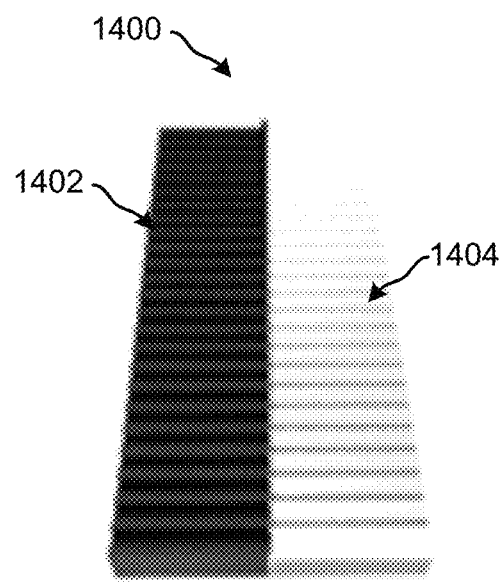

Turning now to FIG. 14A, there is shown an article 1400 having a first region encompassing a first set of reflective ribbons 1402 and having a second region encompassing a second set of reflective ribbons 1404 oriented with a rotational symmetry to each other. The reflective ribbons 1404 may generate the ON and OFF ortho-parallactic optical effect. Under a given illumination condition, the reflective ribbons 1402 in the left region of the article 1400 may appear bright, and reflective ribbons 1404 in the right region of the article 1400 may appear dark at a normal observation angle of the article 1400, which is depicted in FIG. 14B. A tilt of the article 1400 with its upper edge away from the observer switches the brightness of the reflective ribbons 1402 and 1404 in the regions as shown in FIG. 14C.

Although the surfaces of the reflective ribbons (or equivalently, reflective surfaces) in the articles 400, 1000, and 1400 and the magnetically-orientable flakes in the articles 600 and 1100 have often been depicted as being planar, the surfaces of the reflective ribbons and/or the magnetically-orientable flakes may not be planar. Instead, as shown in the layout 1500 in FIG. 15, first and second reflective surfaces 1502, 1504, which may represent either or both of the reflective ribbons 402 and the magnetically-orientable flakes 606 disclosed herein, are depicted as being at rotational symmetry with respect to a plane 1506. The first and second reflective surfaces 1502, 1504 are also depicted as being cupped in order to form reflectors with the properties of a parabolic mirror. When light from a light source 1508 illuminates the first reflective surface 1502, the first reflective surface 1508 may concentrate the rays 1510 in the focal point $F_1$. The second reflective surface 1504, which is directed in an opposite direction to the first reflective surface 1502, may not reflect the light from the light source 1508. However, when the article 1500 is tilted, the second reflective surface 1504 may start to reflect the light incident from the light source 1508.

Figure 15:
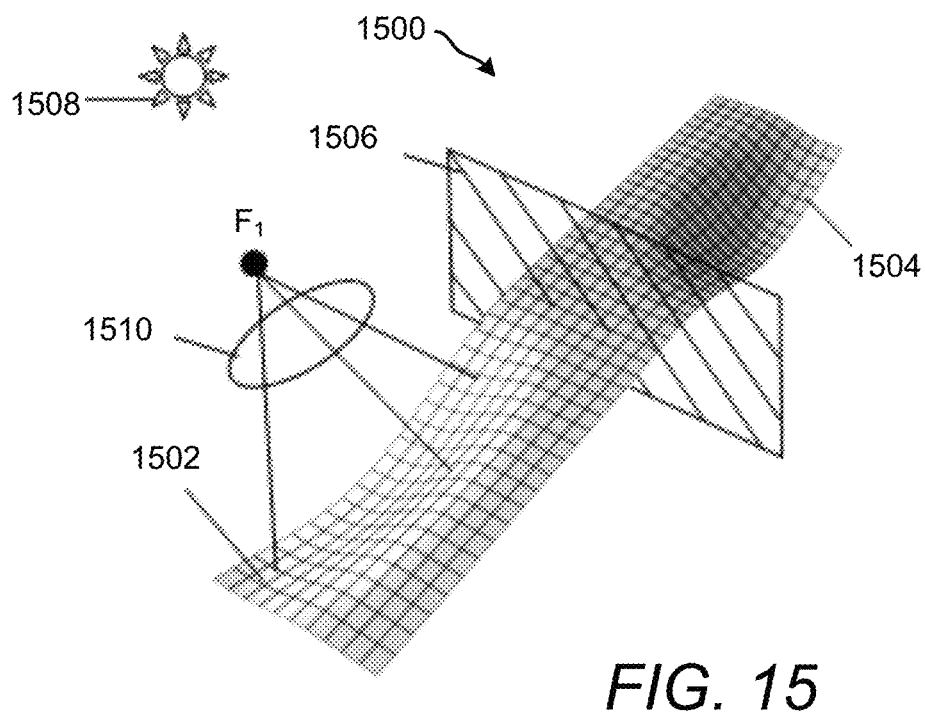
FIG. 15 shows a perspective view of a layout of curved reflective surfaces having rotational symmetry with respect to each other, according to an example of the present disclosure.

When the first and second reflective surfaces 1502, 1504 are assembled in an array of an optical element, such as a security element, the first reflective surface 1502 may reflect the light as a bright shape in the middle on the section of the array formed by the first reflective surfaces 1502. Tilting of the optical element assembled from the first and second reflective surfaces 1502, 1504 illustrated in FIG. 15 may generate a bright shape in the center of the region illuminated with the light. In contrast to the optical element depicted in FIGS. 14A-140, in which the brightness in an entire region switched when the optical element was tilted at a correct angle to the light source, an optical element assembled with parabolic or cylindrical reflective surfaces 1502, 1504 as shown in FIG. 15 may reflect only focused light as a bright shape.

In contrast to embossed reflective ribbons having optical features with an instant ON and OFF flop, reflective surfaces may also be produced with reflective magnetically-orientable flakes, e.g., platelets of magnetic pigment. The magnetically-orientable flakes, which may be dispersed in an organic binder (equivalently referred to as a fluid carrier, liquid coating, wet ink, organic vehicle, paint, and the like) and printed on the top of a web or a sheet of paper, may be aligned with a predetermined magnetic field and may be fixed in their angular states, which may correspond to the magnetic field direction, by solidification of the binder either by UV or IR radiation. An example of the alignment of the magnetically-orientable flakes is illustrated in the article 1600 depicted in FIG. 16A. As shown in that figure, a substrate 1602, which includes a layer of a fluid carrier 1604, which may be ink, an organic binder, etc., may be moved in the direction 1606. The layer 1604 is depicted as containing a first set of magnetically-orientable flakes 1608 (white-filled in FIG. 16A) and a second set of magnetically-orientable flakes 1610 (black-filled in FIG. 16A). Continuous movement of the substrate 1602 with the layer 1604 may cause formation of two continuous regions 1612 and 1614 where the magnetically-orientable flakes 1608 in region 1612 are aligned at a dihedral angle, a, with respect to the substrate 1602 and the direction of travel 1606, and the magnetically-orientable flakes 1610 in the region 614 are aligned at a dihedral angle, β, with respect to the substrate 1602 and the direction opposite to that of travel 1606.

Figure 16A:
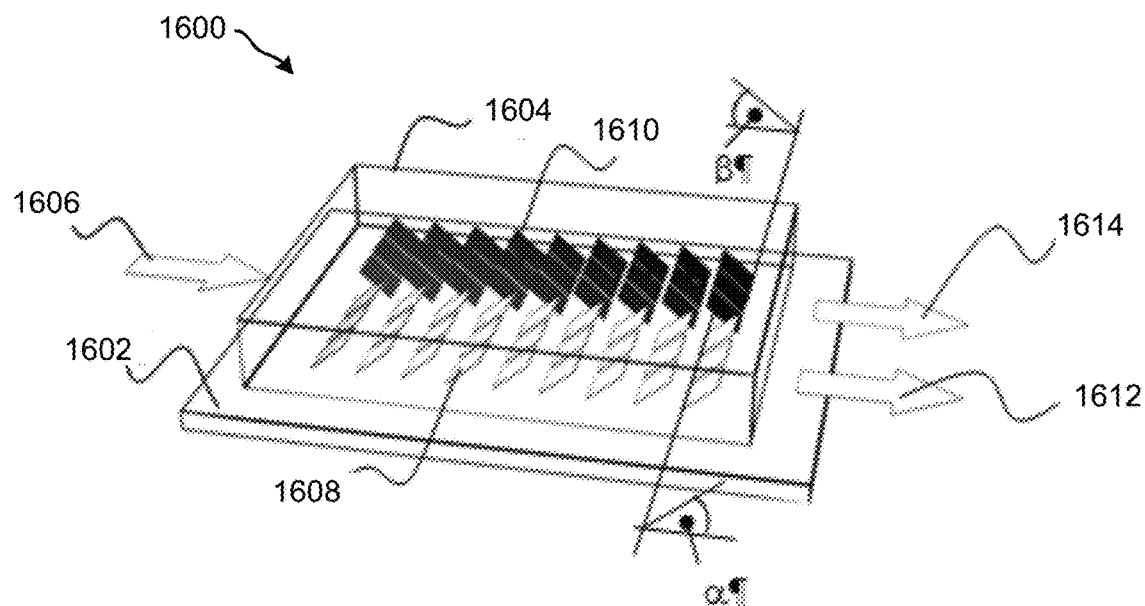
FIG. 16A shows a perspective view of an article having a first set of magnetically-orientable flakes and a second set of magnetically-orientable flakes oriented with a rotational symmetry to each other, according to an example of the present disclosure.
Figure 16B:
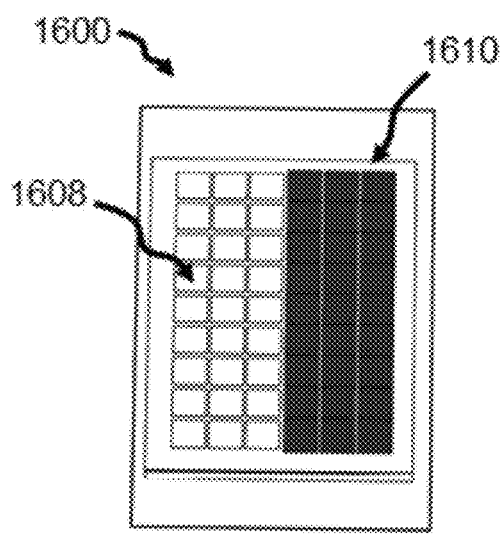
FIGS. 16B and 16C, respectively, show views of the article depicted in FIG. 16A at different tilt angles, according to an example of the present disclosure.
Figure 16C:
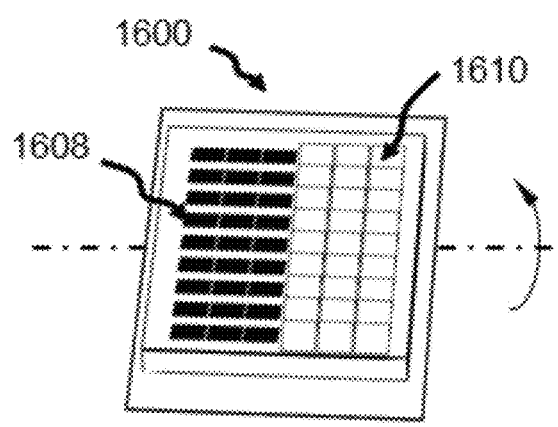

FIG. 16B shows the reflectance of light from the magnetically-orientable flakes 1608 and 1610 at a normal angle of observation. As shown, under a given illumination condition, the magnetically-orientable flakes 1608 in the left region may appear bright if the magnetically-orientable flakes 1608 are achromatic and reflective, while the similar magnetically-orientable flakes 1610 in the right region may appear dark. Being tilted with its upper angle away from the observer as shown in FIG. 16C may cause the magnetically-orientable flakes 1608 in the left region to appear dark and the magnetically-orientable flakes 1610 in the right region to appear bright. However, if the magnetically-orientable flakes 1608, 1610 belong to the family of interference color-shifting pigments, the colors of the regions may correspond to color characteristics of the pigment at the angles at which the magnetically-orientable flakes 1608, 1610 are tilted in the ink.

Figure 17A:
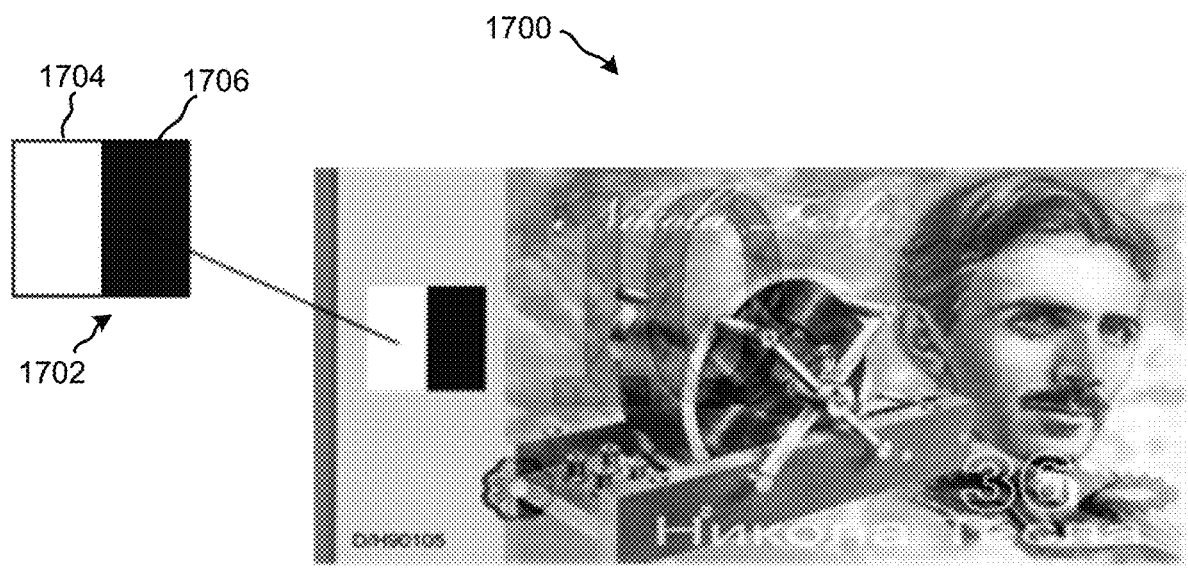
FIGS. 17A and 17C, respectively, depict an article of value having a security element at various tilt angles, according to an example of the present disclosure.
Figure 17B:
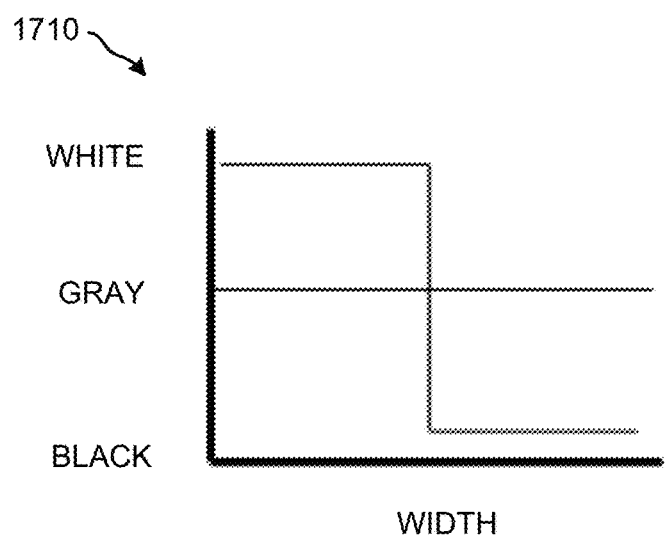
FIGS. 17B and 17D, respectively, show lightness plots corresponding to the security element shown in one of FIGS. 17A and 17C, according to an example of the present disclosure.

Turning now to FIG. 17A, there is shown an article of value 1700, in this case a banknote, having an optical security element 1702. The optical security element 1702 may be produced using the article 1400 depicted in FIGS. 14A-14C or the article 1600 depicted in FIGS. 16A-16C. The optical security element 1702 is depicted as being provided on a left side of the article of value 1700 for purposes of illustration. As shown, the optical security element 1702 is depicted as including a first region 1704 and a second region 1706. In addition, at a normal observation angle under a given illumination condition, the first region 1704 may appear bright and the second region 1706 may appear dark. The appearance difference between the first region 1704 and the second region 1706 may be expressed graphically in the lightness plot 1710 as shown in FIG. 17B. A left-to-right scan of the optical security element 1702 may show an instantaneous change of the lightness from black to bright.

Figure 17C:
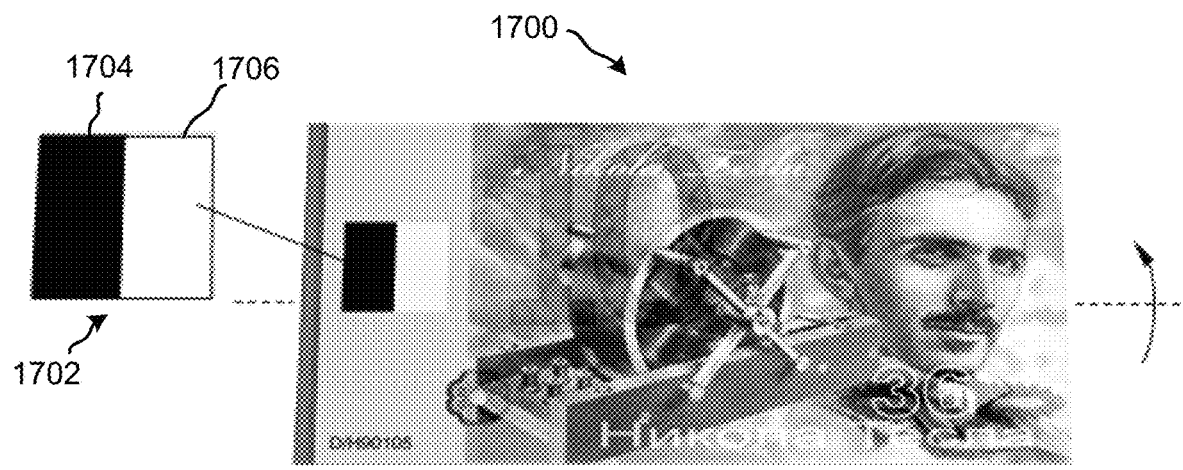
Figure 17D:
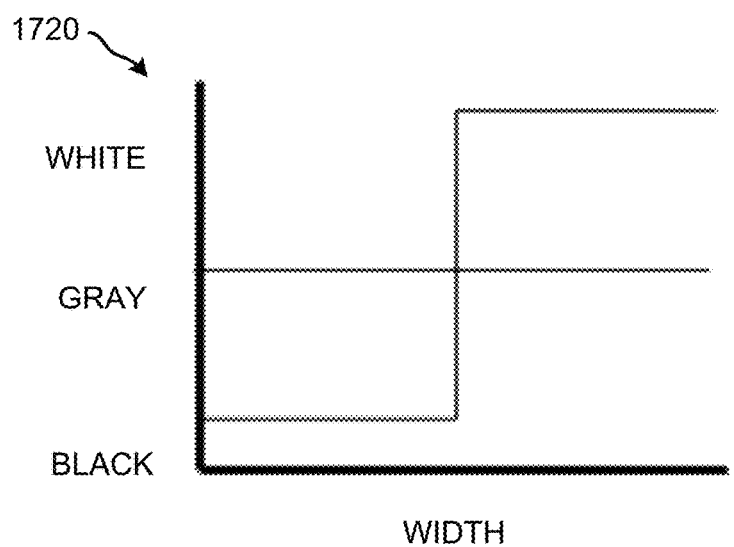

When the article of value 1700 is tilted with its upper edge away from the observer, as shown in FIG. 17C, the first region 1704 may appear dark and the second region 1706 may appear bright. The lightness plot 1720 depicted in FIG. 17D demonstrates how the lightness in the first and second regions 1704 and 1706 are swapped when the article of value 1700 is tilted. Tilting of the article of value 1700 with its upper edge back toward the observer may restore the appearance that the optical security element 1702 demonstrated in FIG. 17A.

Figure 18:
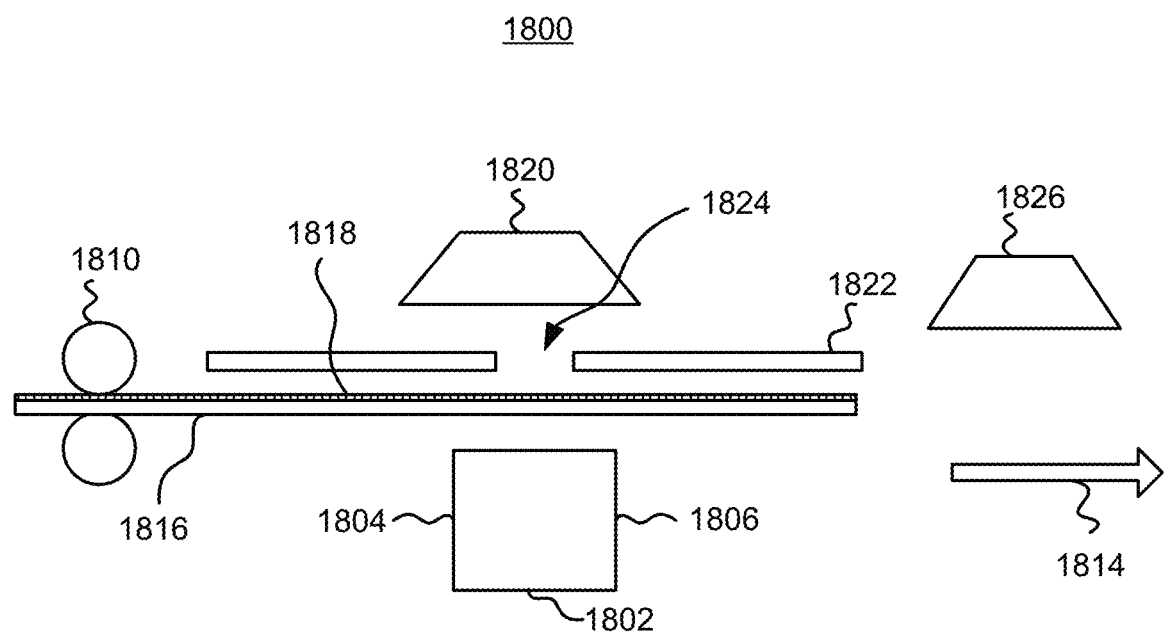
FIG. 18 is a schematic representation of an apparatus for orienting magnetically-orientable flakes, according to an example of the present disclosure.

Turning now to FIG. 18, there is shown a schematic representation of an apparatus 1800 for orienting magnetically-orientable flakes, according to an example of the present disclosure. The apparatus 1800 may be implemented to orient the magnetically-orientable flakes as shown in FIGS. 4A, 11, and 16A. The apparatus 1800 may include a magnet 1802 having a first pole 1804 and a second pole 1806. The first pole 1804 may have a first polarity and the second pole 1806 may have a second, opposite polarity. For instance, the first pole 1804 may be the south pole of the magnet 1802 and the second pole 1806 may be the north pole of the magnet 1802. In other examples, the first pole 1804 may be the north pole and the second pole 1806 may be the south pole. As discussed in greater detail herein below, the opposite poles of the magnet 1802 may apply a magnetic field having magnetic field lines emanating from the magnet 1802. Magnetic vector forces, which may also be termed "magnetic induction," may be defined as forces that may be applied by the magnetic field in various directions that emanate from the magnet 1802. For example, one of the poles of the magnet 1802 might face the bottom surface of the substrate.

The apparatus 1800 is also depicted as including a feeding mechanism 1810 in the form of a pair of rollers arranged to feed a substrate 1816 in a feed direction 1814. Although the substrate 1816 has been depicted as being directly fed by the rollers, the substrate 1816 may instead be supported on a support (not shown). The support, if employed, may be a belt, a platform, one or more rows of grippers, a frame, or the like, and may support the substrate 1816 such that the substrate 1816 may be moved in the feed direction 1814 along with the support as the rollers of the feeding mechanism 1810 are rotated. In various examples, the apparatus 1800 may include additional feeding mechanisms (not shown) provided upstream and/or downstream of the feeding mechanism 1810.

The substrate 1816 may be formed of paper, plastic film, laminate, card stock, or the like. In a particular example, the substrate 1816 is a banknote that may be cut into currency. The substrate 1816 may also be in a continuous roll, or a sequence of substrate sheets, or have any discrete or continuous shape. In addition, at least a portion of an upper surface of the substrate 1816 may be coated with a fluid carrier 1818 in which magnetically-orientable particles or flakes are dispersed. The fluid carrier 1818 may also be termed an ink, a wet ink, or the like. The fluid carrier 1818 may be applied through a printing technique such as gravure, ink-jet printing, flexographic, gravure, Intaglio, silk screen printing, painting, etc. The fluid carrier 1818 may be in the form of ink or paint and may remain in a fluid form for at least a predetermined length of time or until a sufficient amount of energy is applied onto the fluid carrier 1818. For instance, the fluid carrier 1818 may be a liquid or a paste-like carrier and may be curable through receipt of energy in the form of ultra-violet (UV) light, electron beam, heat, etc. By way of particular example, the liquid coating 1818 may be a photopolymer, a solvent-based carrier, a water-based carrier, or the like. In addition, the liquid coating 1818 may be transparent, either clear, colorless, or tinted.

According to an example, the fluid carrier 1818 with the magnetically-orientable flakes may be applied onto the substrate 1816 immediately prior to the substrate 1816 being fed over the magnet 1802 such that the fluid carrier 1818 remains in a fluid state as the fluid carrier 1818 is moved over the magnet 1802. In this example, the feeding mechanism 110 or another mechanism (not shown) of the apparatus 1800 may apply the fluid carrier 1818 with the magnetically-orientable flakes onto the substrate 1816 as the substrate 1816 is fed in the feed direction 1814. The magnetically-orientable flakes may be mixed into the fluid carrier 1818 prior to or after the fluid carrier 1818 has been applied onto the substrate 1816. According to an example, the magnetically-orientable flakes are non-spherical and planar flakes, i.e., pigment flakes that can be aligned using a magnetic field, and may be reflective and/or may be color shifting, e.g., one portion may appear to be one color and the other portion may appear to be another color. The magnetically-orientable flakes may or may not retain remnant magnetization. By way of example, a magnetically-orientable flake may be anywhere from about 1 to about 500 microns across and anywhere from about 0.1 to about 100 microns thick. In addition, the magnetically-orientable flakes may include a metallic layer, such as a thin film of aluminum, gold, nickel, platinum, metal alloy, etc., or may be a metal flake, such as a nickel, iron, or alloy flake. Alternatively, the magnetically-orientable flakes may be coated with a tinted layer, or may include an optical interference structure, such as an absorber-spacer-reflector Fabry-Perot type structure.

The magnetically-orientable flakes viewed normal to the plane of the magnetically-orientable flakes may appear bright, while magnetically-orientable flakes viewed along the edge of the plane may appear dark. For example, light from an illumination source (not shown) may be reflected off the magnetically-orientable flakes to an observer when the magnetically-orientable flakes are in a position normal to the observer. However, if the magnetically-orientable flakes are tilted with respect to the plane normal to the observer, the magnetically-orientable flakes may be viewed on edge and may thus appear dark. Similarly, if the magnetically-orientable flakes are color-shifting, the magnetically-orientable flakes may appear to be one color when viewed along the normal plane and another color or darker when viewed along a tilted plane. Although particular reference is made herein to magnetically-orientable flakes being caused to be aligned with the magnetic field of at least one magnet, it should be understood that in instances, less than all of the magnetically-orientable flakes may become aligned with the magnetic field while still resulting in desired optical effects.

According to examples, the substrate 1816 may be moved through the magnetic field of the magnet 1802 before the fluid carrier 1818 sets or dries to enable the magnetically-orientable flakes to become oriented in the direction of the magnetic field. That is, the feeding mechanism 1810 may feed the substrate 116 along the feed direction 1814 such that the magnetically-orientable flakes in the fluid carrier 1818 are fed through the magnetic field applied by the first pole 1804 and the second pole 1806 of the magnet 1802. The magnetic field can be depicted as having lines of magnetic field (flux density) emanating from the poles of the magnet. Alternatively, the magnetic field can be described as being composed of vector forces, and the magnetically-orientable flakes may become closely aligned with the vector forces. In addition, as the vector forces are not uniform across the magnet 1802, the orientations of the magnetically-orientable flakes may vary depending upon the locations of the magnetically-orientable flakes with respect to the first pole 1804 and the second pole 1806. As such, the orientations of the magnetically-orientable flakes may change as the substrate 1816 is fed through the magnetic field applied by the first pole 1804 and the second pole 1806. In other words, the dihedral angles of magnetically-orientable flakes may change with respect to a plane of the substrate 1816 (dihedral angle is defined as the angle between two planes in a third plane which cuts the line of intersection at right angles).

As also shown in FIG. 1A, the apparatus 1800 may include a radiation source 1820 (or an array of radiation sources 1820), which may apply radiation onto the fluid carrier 1818 to cure or otherwise solidify the fluid carrier 1818 as the substrate 1816 is fed in the feed direction 1814. The radiation source 1820 may apply radiation in the form of ultra-violet (UV) light, electron beam, heat, or the like. A mask 1822 having at least one opening 1824 is also depicted as being positioned between the radiation source 1820 and the fluid carrier 1818 to control which portion or portions of the fluid carrier 1818 receives radiation from the radiation source 1820 as the substrate 1816 passes by the radiation source 1820. The locations on which radiation is emitted onto the substrate 1816 through the at least one opening may be considered to be a radiation footprint. The mask 1822 may have a thickness in the range of between about 0.25 mm to about 2.5 mm (0.01" to about 0.1"). According to an example, the at least one opening 1824 is strategically positioned with respect to the magnet 1802 to cause the magnetically-orientable flakes to be at least partially fixed at predetermined orientations while preventing the magnetically-orientable flakes from being at least partially fixed at other orientations. The opening or openings 1824 may be positioned to at least partially fix the magnetically-orientable flakes to be in a helical or bi-helical arrangement with respect to each other along a direction that is perpendicular (or equivalently, orthogonal or transverse) to the feed direction 1814 and substantially lying within the plane of the substrate 1816. For instance, the mask 1822 may have two or more discrete openings 1824, a continuously varying leading edge, a stepwise varying leading edge, etc. Additionally, the magnetically-orientable flakes may be fixed in a particular arrangement as the substrate 1816 is being fed through a magnetic field and a radiation footprint.

Further shown in FIG. 18 is a second radiation source 1826, which may also apply radiation onto the fluid carrier 1818 in the form of ultra-violet (UV) light, electron beam, heat, or the like. The second radiation source 1826 may apply the same type of energy or a different type of energy as compared with the radiation source 1820. In any regard, the second radiation source 1826 may be optional and may be implemented to further solidify the fluid carrier 1818.

Although reference has been made above to the apparatus 1800 having a particular configuration, it should be understood that the apparatus 1800 may have various other configurations without departing from a scope of the present disclosure. For instance, the apparatus 1800 may include any number of magnets, rollers, etc. In addition, the apparatus 1800 may fix the magnetically-orientable flakes in desired orientations as the substrate is curved around a cylindrical roller or surface.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An article comprising:
    a base layer extending along a first dimension and a second dimension, said second dimension being orthogonal to the first dimension; and
    reflective ribbons provided on an upper surface of the base layer, the reflective ribbons having a surface that extends in the second dimension and forms a dihedral angle with the upper surface of the base layer;
    wherein the dihedral angle changes as a function of distance along the second dimension;
    wherein the changes in the dihedral angle follow a helical configuration.

2. The article according to claim 1, wherein the changes in the dihedral angle follow a hi-helical configuration.

3. The article according to claim 1, wherein the reflective ribbons are angled to cause light reflected from the reflective ribbons to have an ortho-parallactic optical motion effect when a viewing angle of the reflective ribbons is varied.

4. The article according to claim 1, wherein the base layer is formed of a polymeric material and wherein each of the reflective ribbons is a portion of the polymeric material coated with a reflective material.

5. The article according to claim 1, wherein the base layer is formed of a polymeric material that is embossed to include features on which the reflective ribbons are provided.

6. The article according to claim 1, wherein the base layer is formed of a metallic material and wherein the reflective ribbons are facets in the metallic material.

7. The article according to claim 1, wherein the reflective ribbons include curved reflective surfaces.

8. The article according to claim 1, wherein the reflective ribbons have the same dihedral angle with respect to each other along the axis-second dimension.

9. The article according to claim 1, wherein the dihedral angle increases as a function of distance along the second dimension.

10. The article according to claim 1, wherein the article is provided on at least one of a security device and a banknote.

11. An article comprising:
- a layer extending along a first dimension and a second dimension, said second dimension being orthogonal to the first dimension; and
- magnetically-orientable flakes dispersed in the layer, wherein at least a majority of the magnetically-orientable flakes have a surface that extends in the second dimension, forms dihedral angles with the upper surface of the layer, and follow a helical arrangement along the layer.

12. The article according to claim 11, wherein the dihedral angles of the magnetically-orientable flakes extend along the first dimension.

13. The article according to claim 11, wherein the dihedral angles of the magnetically-orientable flakes change as a function of distance across the layer.

14. The article according to claim 11, wherein the dihedral angles of the magnetically-orientable flakes follow a hi-helical arrangement along the layer.

15. The article according to claim 11, wherein the magnetically-orientable flakes are angled to cause light reflected from the magnetically-orientable flakes to have an ortho-parallactic optical motion effect when a viewing angle of the magnetically-orientable flakes is varied.

16. The article according to claim 11, wherein the magnetically-orientable flakes extending in the first dimension have the same dihedral angles with respect to each other.

17. The article according to claim 11, wherein the dihedral angles of the magnetically-orientable flakes are rotated about an axis that extends along the second dimension in the layer.

18. The article according to claim 11, wherein the article is provided on at least one of a security device and a banknote.

* * * * *